US009904990B2

(12) United States Patent
Moraleda et al.

(10) Patent No.: US 9,904,990 B2
(45) Date of Patent: Feb. 27, 2018

(54) SINGLE IMAGE RECTIFICATION

(71) Applicants: Jorge Moraleda, Menlo Park, CA (US); Ekta Prashnani, Madhya Pradesh (IN); Michael J. Gormish, Menlo Park, CA (US); Kathrin Berkner, Los Altos, CA (US); Silvio Savarese, Standford, CA (US)

(72) Inventors: Jorge Moraleda, Menlo Park, CA (US); Ekta Prashnani, Madhya Pradesh (IN); Michael J. Gormish, Menlo Park, CA (US); Kathrin Berkner, Los Altos, CA (US); Silvio Savarese, Standford, CA (US)

(73) Assignee: Ricoh Co., Ltd., Tokyo (JP)

( * ) Notice: Subject to any disclaimer, the term of this patent is extended or adjusted under 35 U.S.C. 154(b) by 121 days.

(21) Appl. No.: 14/975,644

(22) Filed: Dec. 18, 2015

(65) Prior Publication Data
US 2017/0178301 A1 Jun. 22, 2017

(51) Int. Cl.
*G06K 9/00* (2006.01)
*G06T 5/00* (2006.01)
(Continued)

(52) U.S. Cl.
CPC ............ *G06T 5/006* (2013.01); *G06K 9/3233* (2013.01); *G06K 9/3275* (2013.01);
(Continued)

(58) Field of Classification Search
CPC .. G06K 2009/363; G06K 9/46; G06K 9/4604; G06K 9/52; G06K 9/6211; G06T 5/006; G06T 5/00
See application file for complete search history.

(56) References Cited

U.S. PATENT DOCUMENTS 7,953,299 B2   5/2011 Shiiyama
2003/0083850 A1   5/2003 Schmidt et al.
(Continued)

FOREIGN PATENT DOCUMENTS

WO   WO2015086537   6/2015

OTHER PUBLICATIONS

Cham, Tat-Jen, et al. "Estimating camera pose from a single urban ground-view omnidirectional image and a 2D building outline map." Computer Vision and Pattern Recognition (CVPR), 2010 IEEE Conference on. IEEE, 2010.*
(Continued)

*Primary Examiner* — Li Liu
(74) *Attorney, Agent, or Firm* — Patent Law Works LLP

(57) ABSTRACT

The disclosure includes a system and method for performing image rectification using a single image and information identified from the single image. An image recognition application receives an input image, identifies a plurality of objects in the input image, estimates rectification parameters for the plurality of objects, identifies a plurality of candidate rectification parameters using a voting procedure on the rectification parameters for the plurality of objects, estimates final rectification parameters based on the plurality of candidate rectification parameters, computes a global transformation matrix using the final rectification parameters, and performs image rectification on the input image using the global transformation matrix.

20 Claims, 18 Drawing Sheets

(51) Int. Cl.
  *G06T 5/10* (2006.01)
  *G06K 9/32* (2006.01)
  *G06T 3/00* (2006.01)
(52) U.S. Cl.
  CPC .............. *G06T 3/0006* (2013.01); *G06T 5/10* (2013.01); *G06T 2207/20048* (2013.01); *G06T 2207/20212* (2013.01)

(56) References Cited

U.S. PATENT DOCUMENTS

| | | | |
|---|---|---|---|
| 2005/0180632 A1* | 8/2005 | Aradhye | G06K 9/3283 382/182 |
| 2006/0013463 A1 | 1/2006 | Ramsay et al. | |
| 2007/0206877 A1* | 9/2007 | Wu | G06K 9/3283 382/275 |
| 2008/0089615 A1 | 4/2008 | Shiiyama | |
| 2009/0232414 A1* | 9/2009 | Li | G06K 9/4633 382/281 |
| 2012/0243737 A1 | 9/2012 | Ogawa | |
| 2013/0129191 A1* | 5/2013 | Jin | H04N 13/0018 382/154 |
| 2014/0161365 A1* | 6/2014 | Acharya | G06K 9/3283 382/229 |
| 2015/0117787 A1* | 4/2015 | Chaudhury | G06T 7/0018 382/199 |
| 2015/0199573 A1* | 7/2015 | Rane | G06F 17/30247 382/168 |
| 2016/0307059 A1* | 10/2016 | Chaudhury | G06K 9/00463 |
| 2016/0343152 A1* | 11/2016 | Hay | G06T 7/003 |
| 2016/0379077 A1* | 12/2016 | Kropf | G06K 9/46 382/203 |

OTHER PUBLICATIONS

Seitz, Steven M., and Charles R. Dyer. "Complete scene structure from four point correspondences." Computer Vision, 1995. Proceedings., Fifth International Conference on. IEEE, 1995.*
Kwatra, Vivek et al.; "Graphcut Textures: Image and Video Synthesis Using Graph Cuts"; found at http://www.cc.gatech.edu/cpl/projects/graphcuttextures; dated 2003; 10 pages; GVU Center / College of Computing Georgia Institute of Technology.
F. Pitie, et al.; "N-Dimensional Probability Density Function Transfer and its Application to Colour Transfer"; dated 2005; 6 pages; University of Dublin, trinity College Dublin 2, Ireland.
Matthew Brown and David G. Lowe "Automatic Panoramic Image Stitching Using Invariant Features"; dated Dec. 2006; 15 pages; International Journal of Computer Vision 74(1).
Francois Pitie, et al.; "Automated Colour Grading Using Colour Distribution Transfer"; dated 2007; 15 pages; Trinity College Dublin, 2 College Green, Dublin, Ireland.
F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.
Jorge Moraleda and Jonathan J. Hull; "Toward Massive Scalability in Image Matching"; dated 2010; 4 pages; 2010 International Conference on Pattern Recognition.
Mazin, Baptiste, et al. "Combining Color and Geometry for Local Image Matching" dated Nov. 11-15, 2012; 4 pages; 21st International Conference on Pattern Recognition (ICPR 2012), Tsukuba, Japan.
Nicolas Bonneel, et al. "Example-Based Video Color Grading" dated 2013; 11 pages.
Gormish, Michael; "Stitching Software for Ocutag Retail Execution (ORE)", dated Oct. 12, 2015; 15 pages.
Ramya Narasimha, et al. "Colour-Based Post-Processing of RVS Image Matching Results for ORE Product Disambiguation" dated Oct. 21, 2015, 18 pages.

* cited by examiner

| Object No. | Estimated values of $(\Theta,\Psi,\Phi)$ | Vote |
|---|---|---|
| 1 | $(\Theta_1,\Psi_1,\Phi_1)$ | 3 |
| 1 | $(\Theta_2,\Psi_2,\Phi_2)$ | 3 |
| 1 | $(\Theta_3,\Psi_3,\Phi_3)$ | 2 |
| 1 | $(\Theta_4,\Psi_4,\Phi_4)$ | 2 |
| 2 | $(\Theta_1,\Psi_1,\Phi_1)$ | 3 |
| 2 | $(\Theta_2,\Psi_2,\Phi_2)$ | 3 |
| 2 | $(\Theta_3,\Psi_5,\Phi_5)$ | 1 |
| 2 | $(\Theta_4,\Psi_4,\Phi_4)$ | 2 |
| 3 | $(\Theta_1,\Psi_6,\Phi_6)$ | 1 |
| 3 | $(\Theta_2,\Psi_7,\Phi_7)$ | 1 |
| 3 | $(\Theta_3,\Psi_3,\Phi_3)$ | 2 |
| 3 | $(\Theta_4,\Psi_8,\Phi_8)$ | 1 |
| 4 | $(\Theta_1,\Psi_1,\Phi_1)$ | 3 |
| 4 | $(\Theta_2,\Psi_2,\Phi_2)$ | 3 |
| 4 | $(\Theta_3,\Psi_9,\Phi_9)$ | 1 |
| 4 | $(\Theta_4,\Psi_{10},\Phi_{10})$ | 1 |

Figure 9

SINGLE IMAGE RECTIFICATION

BACKGROUND

1. Field of the Invention

The specification generally relates to image processing. In particular, the specification relates to a system and method for performing image rectification using a single image and information identified from the single image.

2. Description of the Background Art

Image rectification is a process of undoing perspective distortion in an image. This technique is a key component in a variety of applications such as aerial imaging, geographic information systems, 3D reconstruction, and depth from stereo images, etc. Many image rectification algorithms use two or more input images and perform a computationally expensive search to determine the rectifying transformation. Other image rectification algorithms may use a single input image to reduce the search space when determining the rectifying transformation, however, these algorithms require restrictions on the input image, for example, the content of the input image should be symmetric or the expected horizontal and vertical lines in a rectified image should be reliably detected from the input image.

SUMMARY

The techniques introduced herein overcome the deficiencies and limitations of the prior art, at least in part, with a system and method for performing image rectification using a single image and information identified from the single image. In one embodiment, the system includes an image recognition application. The image recognition application is configured to receive an input image and identify a plurality of objects in the input image. The image recognition application is further configured to estimate rectification parameters for the plurality of objects. The image recognition application is further configured to identify a plurality of candidate rectification parameters by voting on the rectification parameters for the plurality of objects. The image recognition application is further configured to estimate final rectification parameters based on the plurality of candidate rectification parameters. The image recognition application is further configured to compute a global transformation matrix using the final rectification parameters and perform image rectification on the input image using the global transformation matrix.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

FIG. 9 is a graphical representation of an example rectification parameter table illustrating a Hough voting procedure.

DETAILED DESCRIPTION

Figure 1:
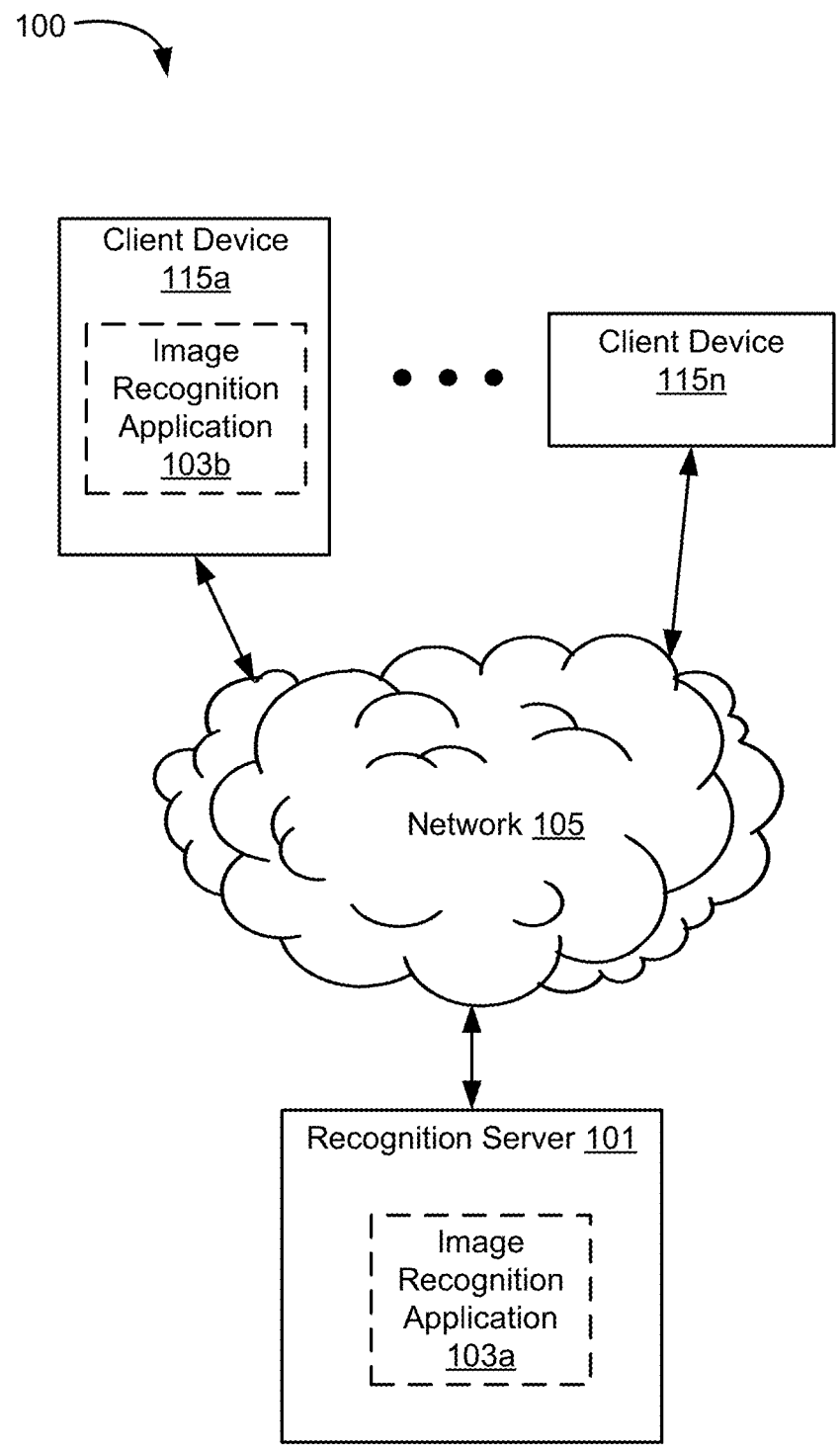
FIG. 1 is a high-level block diagram illustrating one embodiment of a system for performing image rectification using a single image and information identified from the single image.

FIG. 1 is a high-level block diagram illustrating one embodiment of a system 100 for performing image rectification using a single image and information identified from the single image. The illustrated system 100 may have client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In one embodiment, the system 100 includes a recognition server 101 coupled to the network 105. In some embodiments, the recognition server 101 may be either a hardware server, a software server, or a combination of software and hardware. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In one embodiment, the recognition server 101 provides services to a consumer packaged goods firm for identifying products on shelves, racks, or displays. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc.

In some embodiments, the recognition server 101 sends and receives data to and from other entities of the system 100 via the network 105. For example, the recognition server 101 sends and receives data including images of products to and from the client device 115. The images of products received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends an input image to the recognition server 101 and the recognition server 101 provides data in JSON (JavaScript Object Notation) format about one or more objects recognized in the input image to the client device 115. The client device 115 may support use of graphical application program interface (API) such as Metal on Apple iOS™ or RenderScript on Android™ for determination of feature location and features on the client device 115.

The image recognition application 103 may include software and/or logic to provide the functionality for receiving a distorted input image and performing image rectification to correct the distortion, among other things. In some embodiments, the image recognition application 103 can be implemented using programmable or specialized hardware. In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b acts as a thin-client application with some functionality executed on the client device 115 and additional functionality executed on the recognition server 101 by image recognition application 103a. For example, the image recognition application 103b on the client device 115 could include software and/or logic for capturing the image, transmitting the image to the recognition server 101, and displaying image recognition results. A thin-client application 103b may include further functionality described herein with reference to image recognition application 103, such as processing the image and performing feature identification.

In some embodiments, the image recognition application 103 receives an input image depicting a plurality of objects. For example, the input image may be of a shelf stocking products in a retail supermarket. The image recognition application 103 identifies the objects in the input image and generates a region of interest for the identified objects. The image recognition application 103 determines a local transformation matrix for the identified objects based on the region of interest bordering the objects. For example, the local transformation matrix may be an affine transformation matrix. The image recognition application 103 uses the local transformation matrices for the identified objects in the input image to estimate rectification parameters. The image recognition application 103 performs an optimization algorithm on the rectification parameters to determine final rectification parameters. For example, the image recognition application 103 performs Hough voting on the distribution of the rectification parameters, selects inliers from the identified objects in the input image based on a Hough voting scheme, and uses the inliers to determine the final rectification parameters. The image recognition application 103 computes a global transformation matrix based on the final rectification parameters and rectifies the input image using this global transformation matrix. The operation of the image recognition application 103 and the functions listed above are described below in more detail below with reference to FIGS. 3-18.

The techniques described herein advantageously allow for performing image rectification using a single image based on the idea that a global projective transformation can be approximated in small local regions as an affine transformation. In other words, the image recognition application 103 computes an affine transformation matrix that models the image distortion in a small local region of an object, and uses a plurality of affine transformation matrices for a plurality of objects to approximate a global transformation matrix that models the image distortion of the entire input image. The image recognition application 103 is then able to use the global transformation matrix to correct the distortion of the image and obtain a rectified image.

Figure 2:
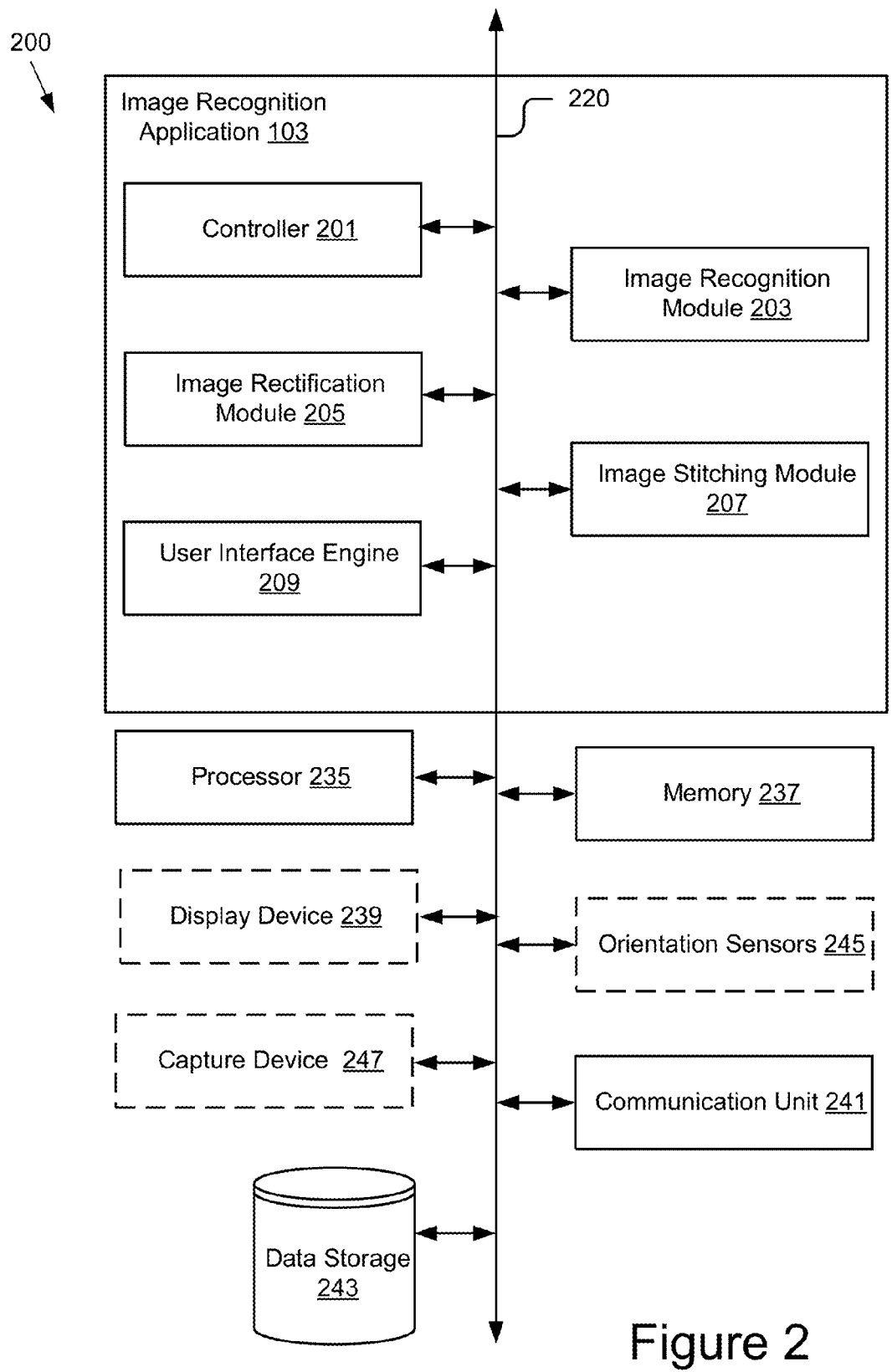
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, an optional display device 239, a communication unit 241, data storage 243, optional orientation sensors 245, and an optional capture device 247 according to some examples. The components of the system 200 are communicatively coupled to a bus or software communication mechanism 220 for communication with each other. In some embodiments, the computing device 200 may be a client device 115, a recognition server 101, or a combination of a client device 115 and a recognition server 101.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction, rectification parameters estimation and optimization, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the optional display device 239, the communication unit 241, the optional orientation sensors 245, the optional capture device 247, the image recognition application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. For example, the memory 237 may include, but is not limited to, one or more of a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-ray™, etc.). It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display the user interfaces described below with reference to FIGS. 4, 5, and 10-13.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image including a plurality of products. The communication unit 241 also transmits information including recognition results to the client device 115 for display, for example, in response to an input image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data of objects and images including the objects. The data can be used for analyzing an input image received from the client device 115 that includes a plurality of objects. In some embodiments, the data storage 243 may store images of objects. An image of an object can be a base image without any distortion. For example, the data storage 243 may store the top, bottom, front, back, and sides of a packaged product as base images of the packaged product. The base image can be an indexed image for an object. For example, an indexed image may be a fully frontal view of an object. The data storage 243 may also include a plurality of object attributes. For example, for a product sitting on a shelf of a retail store, the product attributes may include product name, product identifier, shelf identifier, width, height, depth, area, diagonal length, color, packaging, product description, product size, manufacturer brand, model number, price, material, or the like. The data storage 243 may further include a set of features extracted from an object. For example, the data storage 243 may store a spatial location of an object in an image, the regions of interest for the plurality of objects and the pixel dimensions of the regions of interest. The set of features stored for image recognition can be robust to variations in scale, rotation, ambient lighting, image acquisition parameters, etc. In some embodiments, the data storage 243 may store an object feature table that associates features of an object to an object identifier to support feature based query results retrieval.

The data storage 243 may store other information that is used to provide functionality as described herein. For example, the data storage 243 may store a recognition result of an input image, a local transformation matrix estimated for an object of the input image, a plurality of candidate rectification parameters, final rectification parameters, a global transformation matrix for the input image, etc. The data stored in the data storage 243 is described below in more detail.

The capture device 247 may be operable to digitally capture an image or data of an object of interest. For example, the capture device 247 may be a high definition (HD) camera, a regular 2D camera, a multi-spectral camera, a structured light 3D camera, a time-of-flight 3D camera, a stereo camera, a standard smartphone camera or a wearable computing device. The capture device 247 is coupled to the bus to provide the images and other processed metadata to the processor 235, the memory 237 or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below with reference to FIGS. 4, 5, and 10-13.

In some embodiments, the image recognition application 103 may include a controller 201, an image recognition module 203, an image rectification module 205, an image stitching module 207, and a user interface engine 209. The components of the image recognition application 103 are communicatively coupled via the bus 220. The components of the image recognition application may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The controller 201 may include software and/or logic to control the operation of the other components of the image recognition application 103. The controller 201 controls the other components of the image recognition application 103 to perform the methods described below with reference to FIGS. 14-18. In other implementations, the processor 235, the memory 237 and other components of the image recognition application 103 can cooperate and communicate without the controller 201.

In some embodiments, the controller 201 sends and receives data, via the communication unit 241, to and from one or more of a client device 115 and a recognition server 101. For example, the controller 201 receives, via the communication unit 241, an image from a client device 115 operated by a user and sends the image to the image recognition module 203. In another example, the controller 201 receives data for providing a graphical user interface to a user from the user interface engine 209 and sends the data to a client device 115, causing the client device 115 to present the user interface to the user.

In some embodiments, the controller 201 receives data from other components of the image recognition application 103 and stores the data in the data storage 243. For example, the controller 201 may receive a plurality of local transformation matrices, a plurality of rectification parameters and a global transformation matrix from the image rectification module 205 and stores the data in the data storage 243. In other embodiments, the controller 201 retrieves data from the data storage 243 and sends the data to other components of the image recognition application 103. For example, the controller 201 may receive an indexed image of an object and a region of interest of the object in the indexed image from the data storage 243, and transmit the data to the image rectification module 205.

The image recognition module 203 may include software and/or logic to provide the functionality for receiving and processing an input image to identify one or more objects from the input image and output a recognition result. In some embodiments, the image recognition module 203 receives an input image for recognition from a user accessing the client device 115. The input image may include multiple objects of interest on a shelf in a retail store. For example, the input image can be an image of packaged products such as, rectangular breakfast cereal boxes, circular soda bottles, etc. captured by the client device 115 at a distance from the shelving unit. The packaged product includes textual and pictorial information printed on its surface that distinguishes it from other items on the shelf.

In some embodiments, the image recognition module 203 extracts features from the input image and matches the extracted features to those features stored in the database for recognition. The image recognition module 203 identifies one or more objects in the input image matching the stored features. The image recognition module 203 returns the matched objects and information associated with the matched objects as a recognition result. In some embodiments, the returned information may include a list of object attributes, a spatial location of an object in the received image, and a region of interest (ROI) bordering the object in the received image. For example, the attributes for a product may include manufacturer, size, color, packaging, a product description, material, etc. A region of interest estimates the perimeter of an object in the image and provides an estimation for the position and dimension of the object. For example, the image recognition module 203 may use x-y coordinates on a two-dimensional plane to describe the spatial location of an object and the boundaries of the object (e.g., ROI). The region of interest can be of any shape, for example, a circle with a center point and a diameter, a rectangular shape of a width, a height and one or more reference points for the region (e.g., a center point, one or more corner points for the region), etc. In some embodiments, the image recognition module 203 instructs the user interface engine 209 to generate a graphical user interface that depicts an interactive graphical geometric shape superimposed on the input image. Each graphical geometric shape corresponds to a ROI of an object. For example, the image recognition module 203 instructs the user interface engine 209 to generate an interactive rectangle to be superimposed on a region depicted in the image on the display of the client device 115 to indicate boundaries of a breakfast cereal box. Other examples of interactive graphical geometric shape may include a polygon, a circle, an ellipse, etc. In some embodiments, the image recognition module 203 stores the objects identified from the input image and their corresponding information in the data storage 243.

Figure 4:
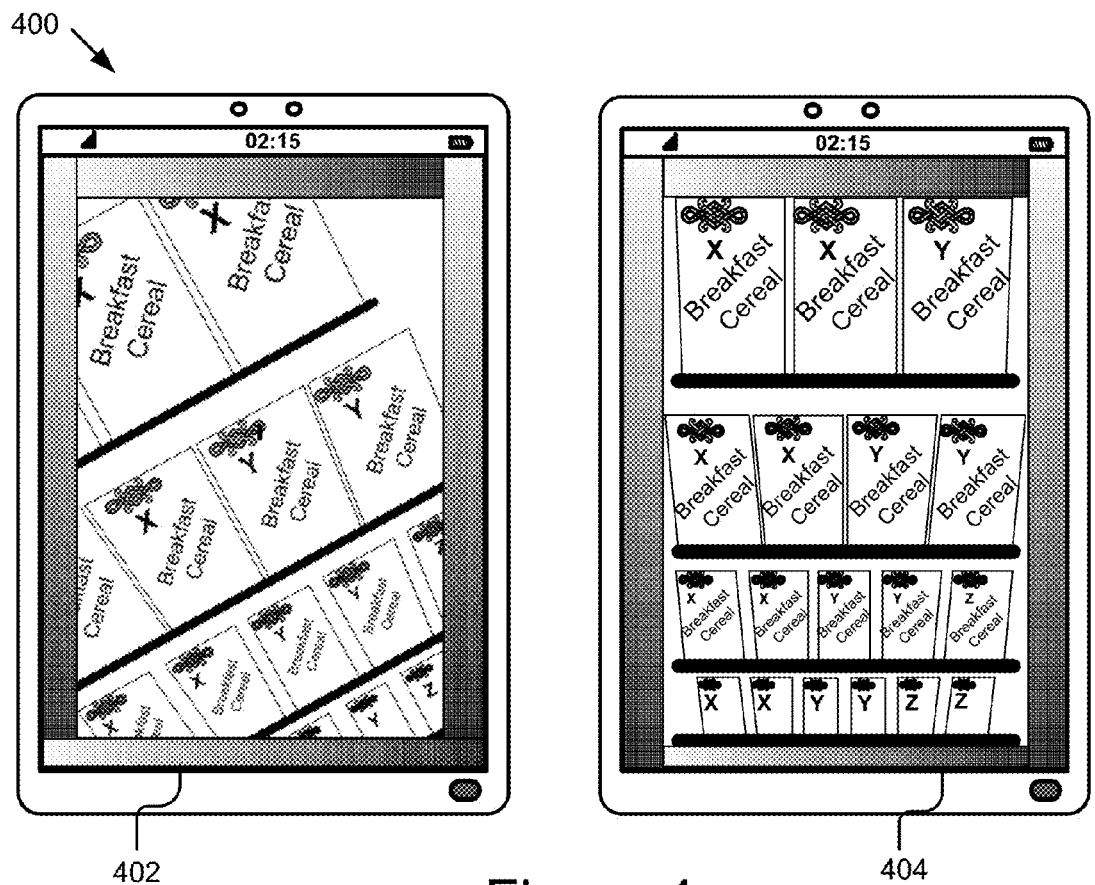
FIG. 4 is a graphical representation of example input images.

The image rectification module 205 may include software and/or logic to provide the functionality for receiving an input image associated with a recognition result from the image recognition module 203 and rectifying the input image. The image rectification module 205 performs image rectification on an input image to correct the perspective distortion presented in the input image. Because of the angle of view at which an image is captured by a camera, an image may include perspective distortion. The perspective distortion shows a warping or transformation of an object and its surrounding area in the image. FIG. 4 is a graphical representation 400 of example input images with perspective distortion. For example, images 402 and 404 of products on shelves in a retail store may be taken by a customer using a mobile device. As depicted in the example of FIG. 4, images 402 and 404 are distorted due to the positioning of the mobile device relative to the shelves when the image was captured.

Figure 5:
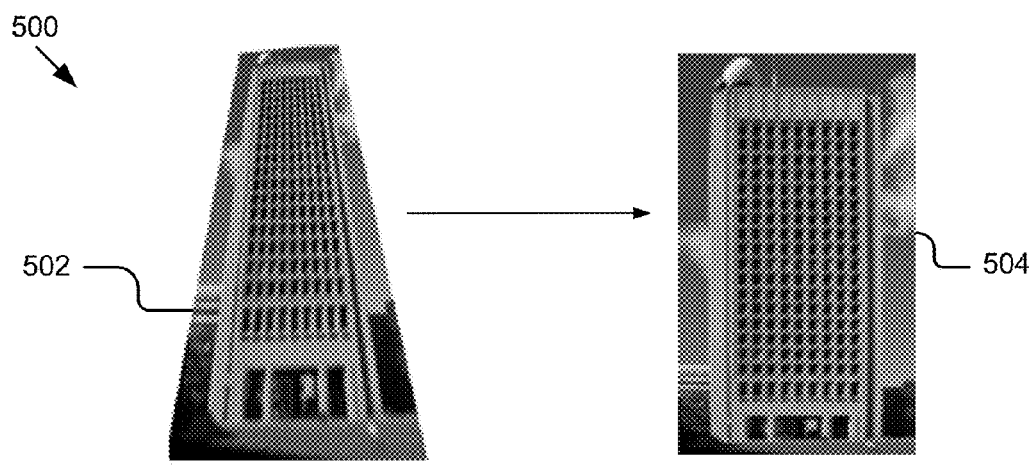
FIG. 5 is a graphical representation of image rectification.

FIG. 5 is a graphical representation 500 of image rectification. Image 502 is an image with perspective distortion. By performing image rectification on image 502 to undo the distortion, image 502 can be transformed into the rectified image 504. Usually image rectification algorithms use two or more images with slightly different viewpoints. However, the image rectification module 205 communicates with the image recognition module 203 to advantageously perform image rectification using a single input image and information identified from the input image.

Figure 3:
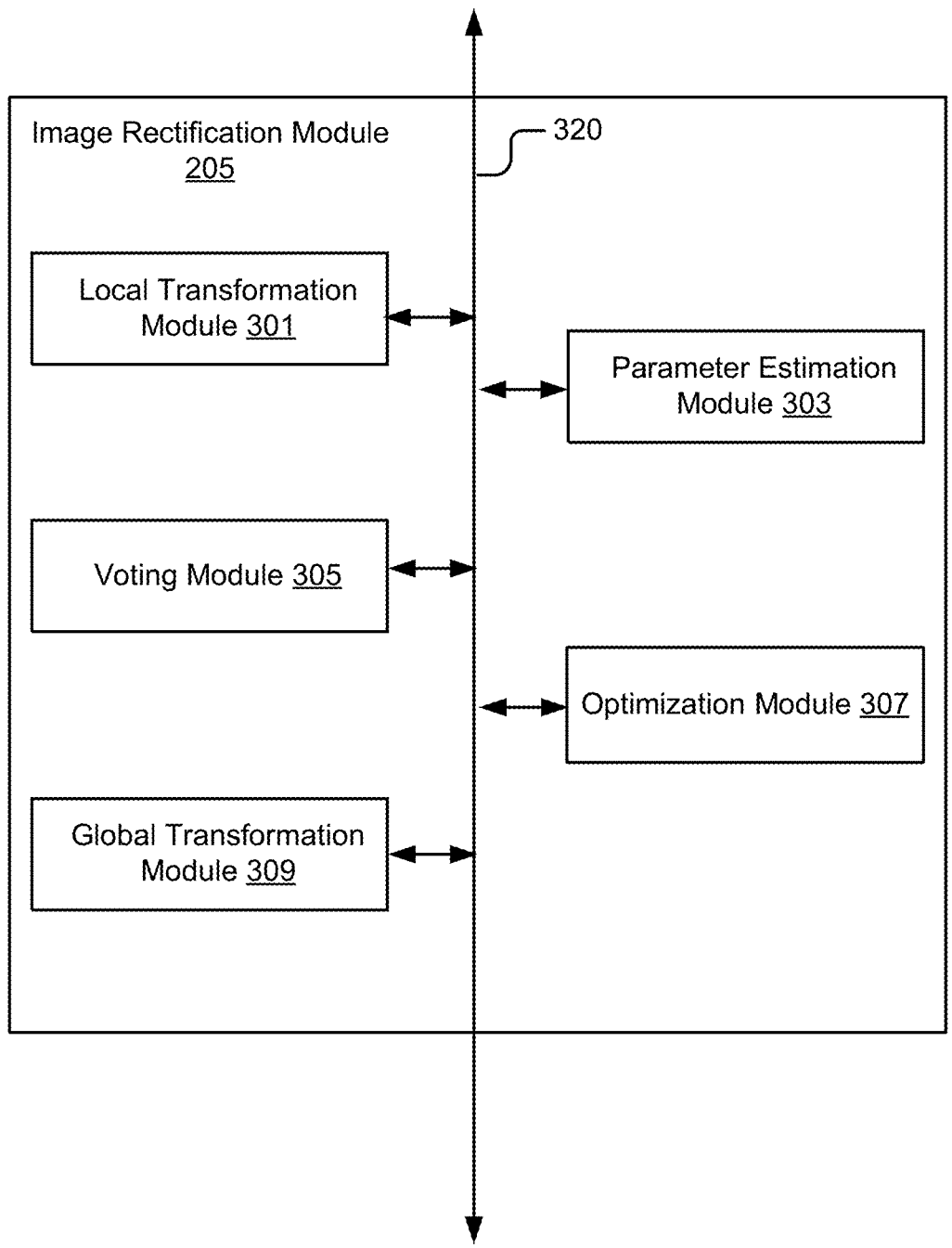
FIG. 3 is a block diagram illustrating components of an image rectification module.

Referring now to FIG. 3, an example of an image rectification module 205 is shown in more detail. In the illustrated example, the image rectification module 205 may include a local transformation module 301, a parameter estimation module 303, a voting module 305, an optimization module 307 and a global transformation module 309. The components of the image rectification module 205 are communicatively coupled to a bus or software communication mechanism 220 for communication with each other.

The local transformation module 301 determines a local transformation matrix for each of the plurality of objects identified from an input image. In some embodiments, the local transformation module 301 determines that a local transformation matrix is a 3×3 affine transformation matrix because a global projective transformation can be approximated in small local regions as an affine transformation. This is described in detail below with reference to FIGS. 6 and 7.

Figure 6:
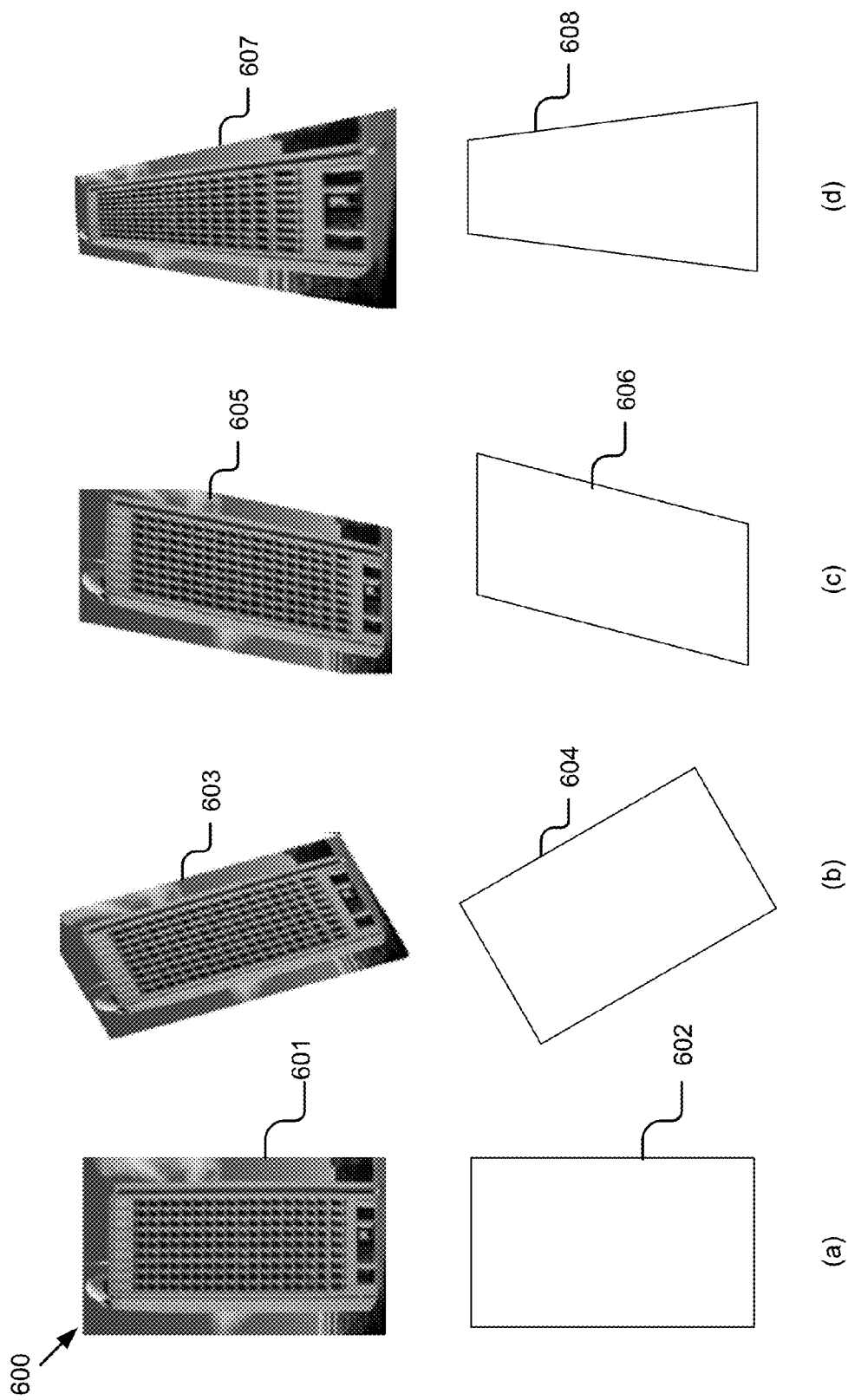
FIG. 6 is a graphical representation of typical image transformations.

FIG. 6 is a graphical representation 600 of typical image transformations. Each of the three image transformations shown in parts (b)-(d) of FIG. 6 can be modeled using a 3×3 matrix that operates on the homogeneous image coordinates. In part (a) of FIG. 6, an undistorted view of an image 601 and a graphical geometric shape 602 corresponding to the image 601 are depicted. In part (b)-(d), image 603 is the result of performing a similarity transformation on image 601, image 605 is the result of performing an affine transformation on image 601, and image 607 is the result of performing a projective transformation on image 601. In part (b)-(d), FIG. 6 also includes graphical geometric shapes 604, 606 and 608 to respectively indicate geometric characteristics of the similarity transformation, the affine transformation, and the projective transformation as compared to the geometric shape 602 corresponding to the undistorted image 601. In particular, as shown in 606, the affine transformation preserves the parallelism and straightness of lines after the transformation while, as shown in 608, the projective transformation only preserves the straightness of lines.

Figure 7:
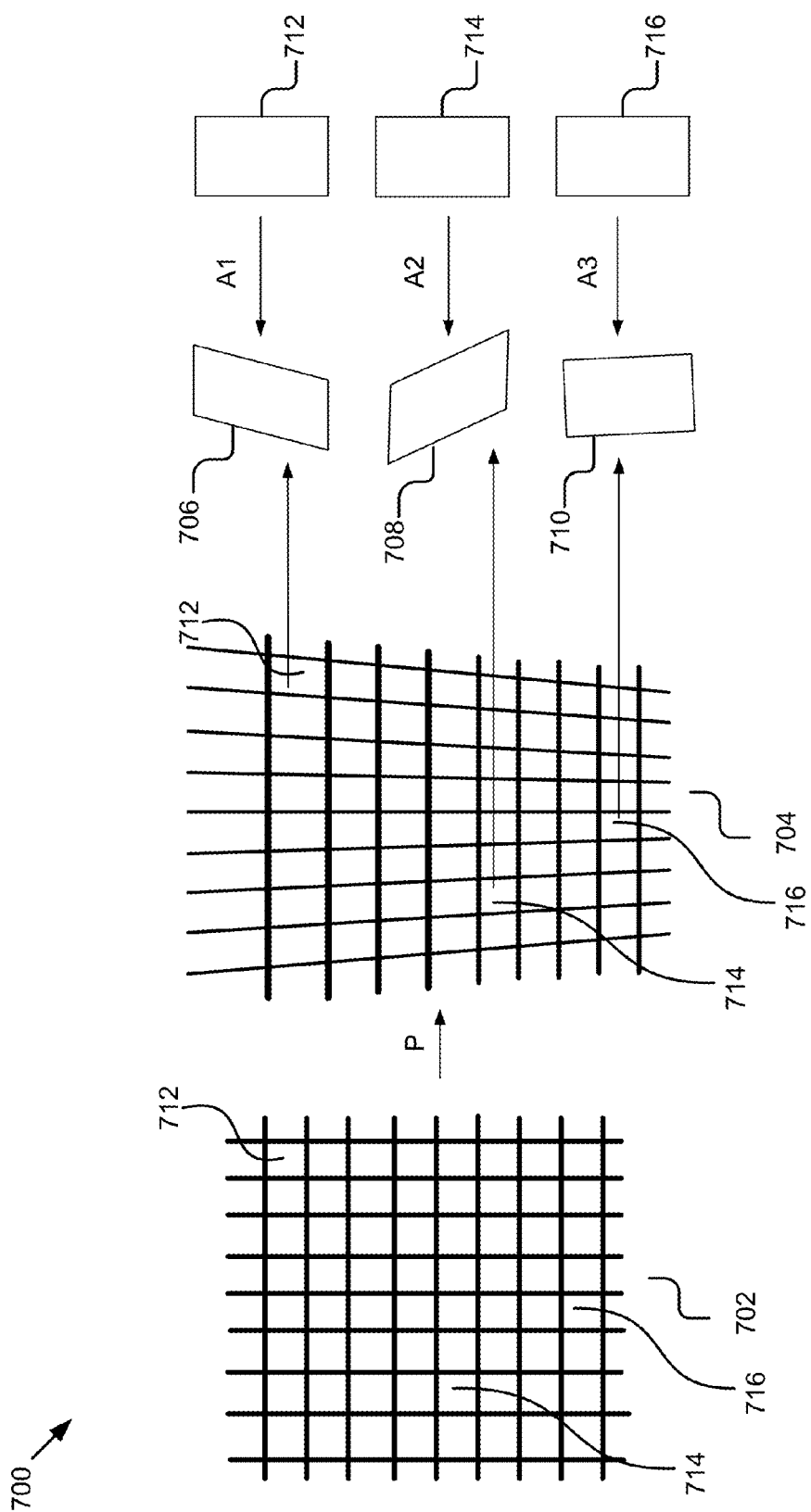
FIG. 7 is a graphical representation of an example projective transformation.

Referring now to FIG. 7, an example 700 of a projective transformation is shown in more detail. In the example of FIG. 7, 702 is a depiction of a regular mesh. 704 shows the regular mesh after a projective transformation is performed (depicted by the operator P) on the regular mesh 702. The straightness of the lines in 702 is preserved by the projective transformation as depicted in 704. While the regular mesh is subjected to a projection transformation, cells (i.e., the area between lines of the regular mesh) 712, 714, and 716 of the regular mesh can be considered to have been subjected to an affine transformation. As illustrated in FIG. 7, an affine transformation A1 on the cell 712 results in the transformed cell 706. An affine transformation A2 on the cell 714 results in the transformed cell 708. An affine transformation A3 on the cell 716 results in the transformed cell 710.

As shown in FIG. 7, the cells (e.g., 706, 708, 710) of a projectively transformed mesh (e.g., 704) appear as they have undergone an affine transformation. Therefore, a global projective transformation can be approximated in small local regions as an affine transformation. As a result, the affine transformations in small local regions can be used to estimate a global projective transformation. The estimation of a global projective transformation will be described in more detail below.

In some embodiments, the image recognition module 203 receives a distorted input image from the client device 115, identifies a plurality of objects from the input image, and returns the identified objects and associated information as a recognition result. The associated information may include a list of object attributes, a spatial location of an object in the input image, and a region of interest (ROI) bordering the object in the input image. Responsive to receiving the input image, the identified objects, and information associated with the identified objects from the image recognition module 203, the local transformation module 301 uses the ROI associated with the identified objects in the input image as small local regions to determine a local transformation matrix (e.g., an affine transformation matrix) for the identified objects. For example, the local transformation module 301 receives an image with 18 identified products sitting on three shelves, and determines a local transformation matrix for each of the 18 products. In some embodiments, to determine the local transformation matrix, the local transformation module 301 retrieves an indexed image of the object from a database on the data storage 243. The indexed image shows a view of an object without significant perspective distortion. The local transformation module 301 also retrieves information associated with the object in the indexed image, for example, a spatial location of the object in the indexed image, a ROI of the object in the indexed image, and the like. The local transformation module 301 then maps the ROI of the object in the input image to the ROI of the object in the indexed image, and estimates a local transformation matrix for the object based on the mapping. For example, the local transformation module 301 may estimate an affine transformation matrix for a product based on mapping the x-y coordinates of the ROI of the product in the input image with the x-y coordinates of the ROI of the product in the indexed image. In some embodiments, the local transformation module 301 may also map the spatial location of the object in the input image to the spatial location of the object in the indexed image, and estimate a local transformation matrix based on both the mapping of the ROIs and the mapping of the spatial locations. In some embodiments, the local transformation module 301 stores the local transformation matrices for a plurality of objects on the data storage 243.

The parameter estimation module 303 estimates rectification parameters for identified objects in an input image based on the local transformation matrices determined for the identified objects. The rectification parameters are used in estimating a global transformation matrix for rectifying the input image.

Figure 8:
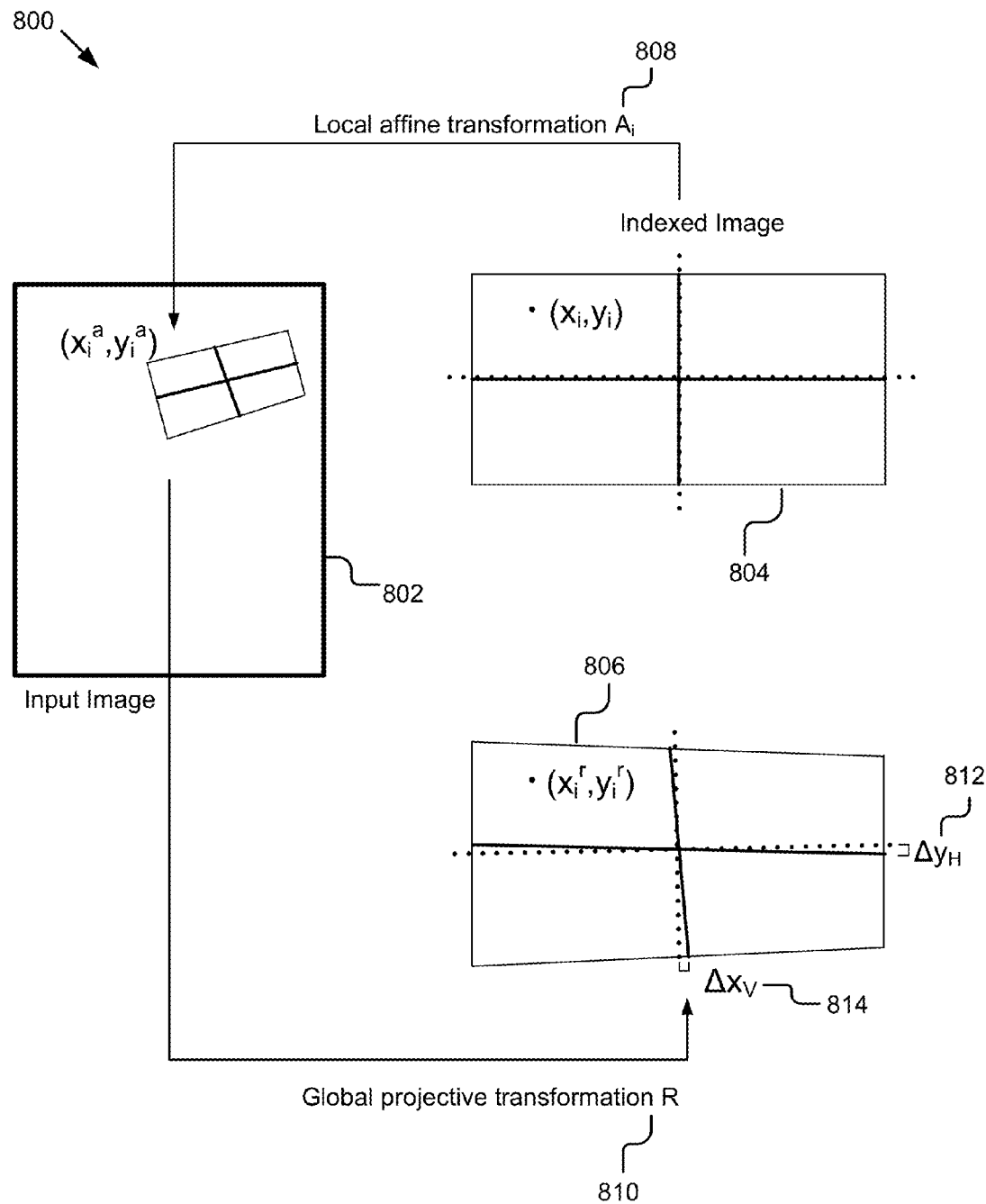
FIG. 8 is a graphical representation of a schematic view of a local affine transformation and a global projective transformation.

FIG. 8 is a graphical representation 800 of a schematic view of a local affine transformation and a global projective transformation. The image recognition module 203 identifies N objects from a distorted input image 802, for example, 11 breakfast cereal boxes and 15 toothpaste boxes. For the $i^{th}$ object of N objects, the local transformation module 301 receives a ROI associated with the object i in the input image 802 and a ROI associated with the object i in an indexed image 804. Based on the ROIs, the local transformation module 301 estimates a local affine transformation matrix $$A_i = \begin{bmatrix} a_i & b_i & c_i \\ d_i & e_i & f_i \\ 0 & 0 & 1 \end{bmatrix}$$

as shown in 808 for the object i, which transforms the position of the object i in the indexed image 804 to the position of the object i in the input image 802. As illustrated in FIG. 8, for each point $(x_i, y_i)$ in the indexed image 804 of $i^{th}$ object, the corresponding point $(x_i^a, y_i^a)$ in the distorted input image 802 is:

$$\begin{bmatrix} x_i^a \\ y_i^a \\ 1 \end{bmatrix} \sim \begin{bmatrix} a_i & b_i & c_i \\ d_i & e_i & f_i \\ 0 & 0 & 1 \end{bmatrix} \begin{bmatrix} x_i \\ y_i \\ 1 \end{bmatrix} \quad \text{(Equation 1)}$$

To rectify the input image 802, a global transformation matrix R in 810 is used to correspond the point $(x_i, y_i)$ of the object i to $(x_i^r, y_i^r)$ in the rectified image 806:

$$\begin{bmatrix} x_i^r \\ y_i^r \\ 1 \end{bmatrix} \sim R \begin{bmatrix} a_i & b_i & c_i \\ d_i & e_i & f_i \\ 0 & 0 & 1 \end{bmatrix} \begin{bmatrix} x_i \\ y_i \\ 1 \end{bmatrix} \quad \text{(Equation 2)}$$

The expectation of using a rectification matrix (i.e., the global transformation matrix R in 810) to correct the perspective distortion of the input image 802 is to make the horizontal and vertical lines in the scene of the input image 802 appear horizontal and vertical in the rectified image 806. Therefore the drift in $y_i^r$ as shown in 812 should be near zero to meet the expectation in the horizontal direction, i.e., $\Delta y_H = 0$. Similarly, the drift in $x_i^r$ as shown in 814 should also be near zero to meet the expectation in the vertical direction i.e., $\Delta x_V = 0$. The following equations accomplish this result:

$$\frac{\partial x_i^r}{\partial y_i} = 0 \text{ and } \frac{\partial y_i^r}{\partial x_i} = 0 \quad \text{(Equation 3)}$$

for all $i = 1, 2, \ldots N$.

The parameter estimation module 303 uses Equation 3 as a constraint to search rectification parameters for the global transformation matrix R. Since only a single input image is used for image rectification, the parameter estimation module 303 can also simplify assumptions about camera parameters. For example, the parameter estimation module 303 may assume that the field of view of a camera is π/6, the camera lens center coincides with an image center, the pixel aspect ratio is one, and the planar scene presented in the input image 802 is positioned at Z=0. Other camera parameter assumptions may be made or input by a system administrator. Based on Equation 3 and the assumptions, the parameter estimation module 303 models the projection operation, which results in the perspective distortion of the input image 802, as a 3×3 matrix P:

Equation (4)

$$P = \begin{bmatrix} \cos\theta\cos\psi & -\sin\psi\cos\theta & 0 \\ -\sin\phi\sin\theta\cos\psi + \cos\phi\sin\psi & \sin\phi\sin\theta\sin\psi + \cos\psi\cos\phi & 0 \\ \sin\theta\cos\phi\cos\psi + \sin\phi\sin\psi & -\sin\theta\cos\phi\sin\psi + \sin\phi\cos\psi & 1 \end{bmatrix}$$

Here the rectification parameters (θ, ψ, φ) are the Euler angles used to describe a camera position. Since the global transformation matrix R is used to rectify the input image 802 by undoing the perspective distortion caused by the projection operation P, the parameter estimation module 303 determines $R = P^{-1}$ and computes R as follow:

Equation (5)

$$R = \begin{bmatrix} -\sin\phi\sin\psi\sin\theta + \cos\phi\cos\theta & \sin\phi\sin\psi\cos\theta + \sin\theta\cos\phi & 0 \\ -\sin\theta\cos\psi & \cos\psi\cos\theta & 0 \\ \sin\phi\sin\theta - \sin\psi\cos\phi\cos\theta & -\sin\phi\cos\theta - \sin\psi\sin\theta\cos\phi & \cos\phi\cos\psi \end{bmatrix}$$

A conventional rectification transformation algorithm may estimate eight parameters to compute a global transformation matrix R. However, by using a single image for rectification, the parameter estimation module 303 reduces the eight parameters to three parameters (θ, ψ, φ), which greatly reduces the search space for a plausible R and increases the computation efficiency.

Using Equations 2, 3 and 5, the parameter estimation module 303 evaluates the constraints in Equation 3 at point $(x_i, y_i)=(0,0)$ without loss of generality. As a result, the parameter estimation module 303 determines that:

$$\tan\psi = \frac{1}{a_i f_i - c_i d_i}(a_i \sin\theta - d_i \cos\theta) \quad \text{Equation (6)}$$

and $$\tan\phi = \frac{b_i \cos\theta - e_i \sin\theta}{b_i f_i \cos\psi + b_i \sin\psi \sin\theta - c_i e_i \cos\psi - e_i \sin\psi \cos\theta} \quad \text{Equation (7)}$$

for all $i = 1, 2, \ldots N$.

As shown in Equations 6 and 7, the parameter estimation module 303 now reduces the three parameters (θ, ψ, φ) to one independent parameter θ. For any given value of the independent angle θ, the parameter estimation module 303 can compute values of angles ψ and φ using Equations 6 and 7. In some embodiments, the parameter estimation module 303 quantizes the angle θ with a quantization step size Δθ in a range bounded by a lower bound $θ_L$ and an upper bound $θ_U$. For example, the parameter estimation module 303 quantizes the angle θ to get the quantized values ($θ_L$, $θ_L+Δθ$, $θ_L+2Δθ$, ..., $θ_U$), for example, Δθ=0.05 radians. The parameter estimation module 303 then computes values of angles ψ and φ by using the quantized values ($θ_L$, $θ_L+Δθ$, $θ_L+2Δθ$, ..., $θ_U$) in Equations 6 and 7. In some implementations, instead of determining the quantization of the (θ, ψ, φ) space, the parameter estimation module 303 estimates values of (sin θ, tan ψ, tan φ) based on the quantization of sin θ to avoid computing inverse tangents (e.g., this avoids the potential infinity number). For example, the parameter estimation module 303 sets a quantization step size for sin θ to be 0.0175 and computes values of (sin θ, tan ψ, tan φ). The parameter estimation module 303 transmits estimated values of (θ, ψ, φ) or (sin θ, tan ψ, tan φ) to the voting module 305.

The voting module 305 receives estimation of values (θ, ψ, φ) from the parameter estimation module 303 and identifies a plurality of candidate rectification parameters ($θ^+$, $ψ^+$, $φ^+$). The candidate rectification parameters ($θ^+$, $ψ^+$, $φ^+$) are a subset of estimated values (θ, ψ, φ) and are close to the final rectification parameters ($θ^*$, $ψ^*$, $φ^*$) used to compute the global transformation matrix R.

In some embodiments, the voting module 305 receives quantized estimations of (θ, ψ, φ), performs a voting procedure on the quantized estimations, and identifies the candidate rectification parameters ($θ^+$, $ψ^+$, $φ^+$) based on the voting procedure. For example, the voting procedure may be based on Hough transform voting. Typically, Hough transform voting is used in analysis of digital images for detecting shapes such as straight lines, circle or ellipses. Hough transform voting is executed in a set of all possible combinations of values for all different parameters contained within a mathematical model of the problem. In Hough transform voting, each possible combination casts an individual vote, from which a selected value may be obtained as a local maximum when it receives a maximum number of votes among all other possible combinations.

In some embodiments, the voting module 305 performs a voting procedure on all combinations of estimated values of (θ, ψ, φ) to identify candidate rectification parameters ($θ^+$, $ψ^+$, $φ^+$) with a maximum number of votes. FIG. 9 is a graphical representation 900 of an example rectification parameter table illustrating a voting procedure. The rectification parameter table 902 includes object numbers in column 904, estimated values of (θ, ψ, φ) in column 906, and the number of votes that each estimated value of (θ, ψ, φ) received in column 908. As shown in FIG. 9, the image recognition module 203 identifies four objects from a distorted input image. The identified objects are referenced in the table 902 by an object number in column 904. As described above, the local transformation module 301 computes a local transformation matrix for the identified objects in the distorted input image (i.e., $A_1$ for object 1, $A_2$ for object 2, etc.). Based on each local transformation matrix (i.e., $A_1$, $A_2$, $A_3$, and $A_4$) and quantized values of θ the parameter estimation module 303 computes sets of estimated values (θ, ψ, φ) for each identified object in the distorted input image using Equations 6 and 7 described above. As shown in the example of FIG. 9, four quantized values of θ are used to determine the estimated parameter values but it should be apparent that any number of quantized values may be used. For example, the parameter estimation module 303 computes ($θ_1$, $ψ_1$, $φ_1$), ($θ_2$, $ψ_2$, $φ_2$), ($θ_3$, $ψ_3$, $φ_3$), and ($θ_4$, $ψ_4$, $φ_4$) for the first identified object based on the local transformation matrix $A_1$, computes ($θ_1$, $ψ_1$, $φ_1$), ($θ_2$, $ψ_2$, $φ_2$), ($θ_3$, $ψ_5$, $φ_5$), and ($θ_4$, $ψ_4$, $φ_4$) for the second identified object based on the local transformation matrix $A_2$, and so on. Thus, for each identified object in the distorted input image, the parameter estimation module 303 determines a set of rectification parameters (θ, ψ, φ) based on the local transformation matrices.

Based on the estimated rectification parameters (θ, ψ, φ) depicted in column 906, the voting module 305 counts a vote for each estimated parameter value of (θ, ψ, φ) that is determined by the parameter estimation module 303. For example, each occurrence of an estimated parameter value (e.g., ($θ_1$, $ψ_1$, $φ_1$), ($θ_2$, $ψ_2$, $φ_2$), etc.) is counted as a vote by the voting module as depicted column 908. In some embodiments, the voting module 305 may determine that similar estimated parameter values are counted as the same for voting purposes. The voting module 305 identifies the candidate rectification parameters ($θ^+$, $ψ^+$, $φ^+$) based on the estimated parameter values of (θ, ψ, φ) that received a maximum number of votes among the estimated parameter values. For example, as shown in column 908 of table 902, the estimated parameter values ($θ_1$, $ψ_1$, $φ_1$) and ($θ_2$, $ψ_2$, $φ_2$) received a maximum number of three votes. The voting module 305 therefore identifies ($θ_1$, $ψ_1$, $φ_1$) and ($θ_2$, $ψ_2$, $φ_2$) as the candidate rectification parameters ($θ^+$, $ψ^+$, $φ^+$). Although the voting procedure in FIG. 9 uses only four objects and four sets of estimated values (θ, ψ, φ) for each of the four objects to identify the candidate rectification parameters ($θ^+$, $ψ^+$, $φ^+$), it will be apparent, however, to one skilled in the art that a different number of objects and a different number of estimated values (θ, ψ, φ) may be used in the voting procedure to identify the candidate rectification parameters ($θ^+$, $ψ^+$, $φ^+$). Additionally, although the voting procedure described with reference to FIG. 9 uses all four identified objects to estimate the candidate rectification parameters ($θ^+$, $ψ^+$, $φ^+$), it will be apparent that only a portion of the identified objects may be used in the voting procedure.

In some embodiments, the voting module 305 transmits the estimated rectification parameters and the candidate rectification parameters ($\theta^+$, $\psi^+$, $\phi^+$) to the optimization module 307 for determining final rectification parameters. In other embodiments, the voting module 305 stores the estimated rectification parameters and the candidate rectification parameters ($\theta^+$, $\psi^+$, $\phi^+$) in the data storage 243.

The optimization module 307 determines final rectification parameters ($\theta^*$, $\psi^*$, $\phi^*$) using an optimization algorithm based on the candidate rectification parameters ($\theta^+$, $\psi^+$, $\phi^+$). The final rectification parameters ($\theta^*$, $\psi^*$, $\phi^*$) are used to compute the global transformation matrix R.

In some embodiments, the optimization module 307 identifies, from the identified objects in the distorted input image, a set of inliers (i.e., objects corresponding to the candidate rectification parameters ($\theta^+$, $\psi^+$, $\phi^+$)). In a planar scene with no noise in a recognition result, all the objects would contribute to the votes for the candidate rectification parameters ($\theta^+$, $\psi^+$, $\phi^+$). However, in some scenarios, the rectification parameters ($\theta$, $\psi$, $\phi$) estimated for some objects would fall outside the candidate rectification parameters ($\theta^+$, $\psi^+$, $\phi^+$) due to noise in object recognition, objects being out of alignment on the shelves, etc. These objects may be identified as outliers. The optimization module 307 uses the candidate rectification parameters ($\theta^+$, $\psi^+$, $\phi^+$) to distinguish outliers and inliers in the identified objects, and reduces the objects used to calculate the final rectification parameters ($\theta^*$, $\psi^*$, $\phi^*$) to the set of inliers.

Referring back to FIG. 9, the voting module 305 identifies that ($\theta_1$, $\psi_1$, $\phi_1$) and ($\theta_2$, $\psi_2$, $\phi_2$) receive a maximum number of three votes and determines that the candidate rectification parameters ($\theta^+$, $\psi^+$, $\phi^+$) include ($\theta_1$, $\psi_1$, $\phi_1$) and ($\theta_2$, $\psi_2$, $\phi_2$). The optimization module 307 determines that the first object, the second object and the fourth object contribute to the three votes to ($\theta_1$, $\psi_1$, $\phi_1$) and ($\theta_2$, $\psi_2$, $\phi_2$), while the third object does not contribute a vote for either ($\theta_1$, $\psi_1$, $\phi_1$) or ($\theta_2$, $\psi_2$, $\phi_2$). The optimization module 307 therefore determines that the first, second, and fourth objects are inliers that contribute to the maximum number of votes for the candidate rectification parameters. The optimization module 307 reduces the set of identified objects from four objects to three objects by eliminating the third object.

Figure 10:
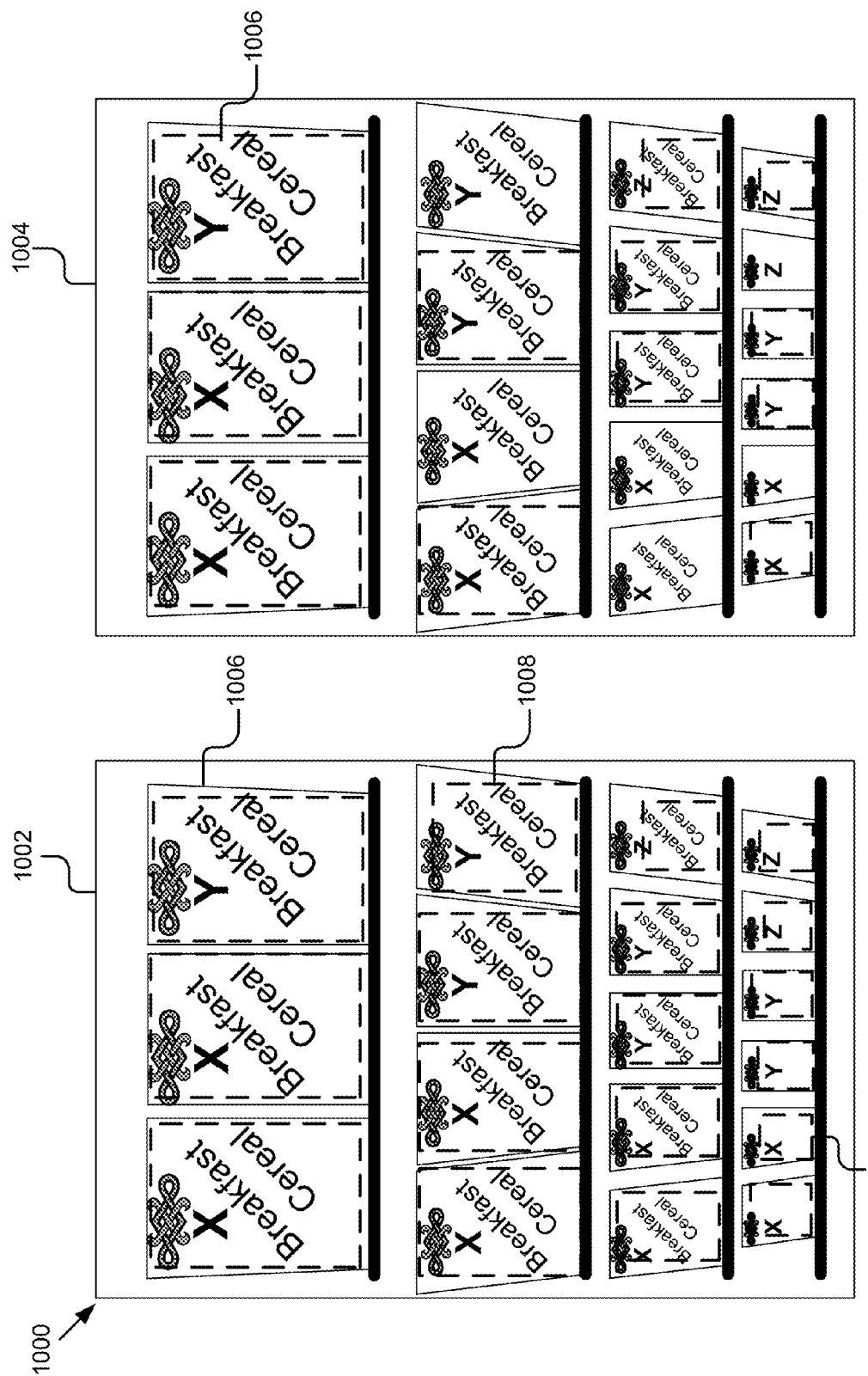
FIG. 10 is a graphical representation of example inliers obtained from a Hough voting procedure.

FIG. 10 is a graphical representation 1000 of example inliers obtained from a voting procedure. In the example of FIG. 10, the image recognition module 203 identifies 18 breakfast cereal boxes from an input image and indicates each identified box with a ROI shown as a dashed area of the recognition result 1002. For example, the recognition result 1002 includes a first breakfast cereal box, a second breakfast cereal box, and a third breakfast cereal box associated with a ROI 1006, 1008, and 1010 respectively. After a voting procedure, the optimization module 307 determines that the second breakfast cereal box and the third breakfast cereal box do not contribute to the votes for candidate rectification parameters ($\theta^+$, $\psi^+$, $\phi^+$), and eliminates the ROIs 1008 and 1010 associated with the second and third breakfast cereal boxes from contributing to the final rectification parameters. As a result, the recognition result 1004 does not include ROIs 1008 and 1010 associated with the second and third breakfast cereal boxes. In total, after the voting procedure, the recognition result 1004 is reduced to 13 recognized objects (i.e., inliers) with five outliers being eliminated from the 18 recognized object in the recognition result 1002.

In some embodiments, the optimization module 307 compares the candidate rectification parameters ($\theta^+$, $\psi^+$, $\phi^+$) with each estimated value ($\theta$, $\psi$, $\phi$) for the plurality of identified objects and notifies the image recognition module 203 of a potential identification error if the estimated value ($\theta$, $\psi$, $\phi$) for an object differs from the candidate rectification parameters ($\theta^+$, $\psi^+$, $\phi^+$) by a defined margin.

The optimization module 307 determines final rectification parameters using an optimization algorithm based on the reduced set of objects (i.e., inliers). Since the optimization module 307 excludes outliers with estimated rectification parameters ($\theta$, $\psi$, $\phi$) falling outside the candidate rectification parameters ($\theta^+$, $\psi^+$, $\phi^+$) from computing the final rectification parameters, the accuracy and efficiency of computation are increased. In some embodiments, the optimization module 307 determines the final rectification parameters ($\theta^*$, $\psi^*$, $\phi^*$) by solving the following equation for inliers:

$$(\theta^*, \psi^*, \phi^*) = \mathrm{argmin}_{(\theta, \psi, \phi)} \sum_{i \in inliers} \left\| \frac{\partial x_i^r}{\partial y_i} \right\|^2 + \left\| \frac{\partial y_i^r}{\partial x_i} \right\|^2 \quad \text{Equation (8)}$$

In Equation 8, the optimization module 307 computes $$\frac{\partial x_i^r}{\partial y_i} \text{ and } \frac{\partial y_i^r}{\partial x_i}$$

at $(x_i, y_i) = (0,0)$ using Equations 3 and 5 described above. In some embodiments, the optimization module 205 transmits the final rectification parameters ($\theta^*$, $\psi^*$, $\phi^*$) to the global transformation module 309. In some embodiments, the optimization module 307 also stores the final rectification parameters ($\theta^*$, $\psi^*$, $\phi^*$) in the data storage 243.

Figure 11:
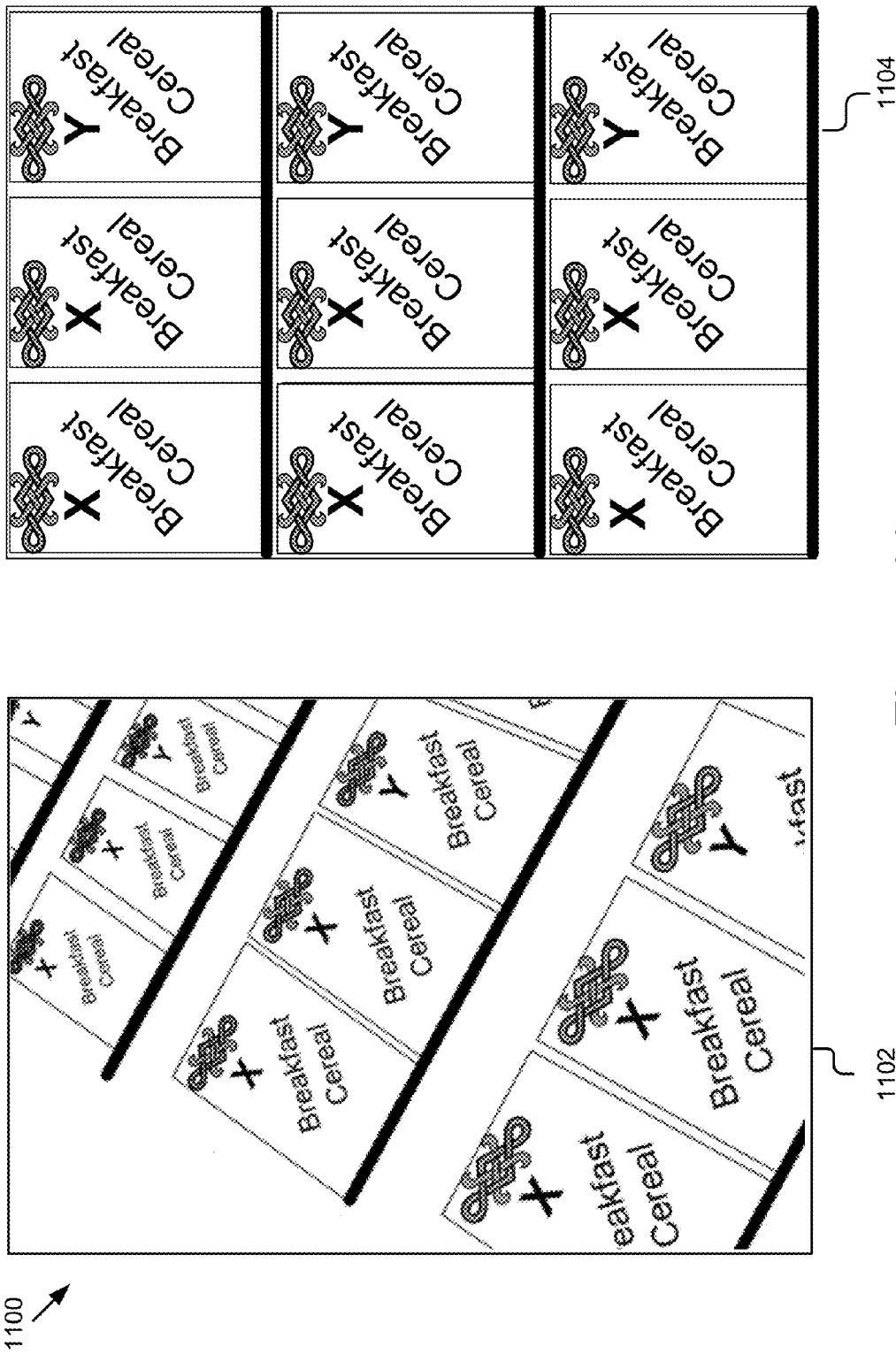
FIG. 11 is a graphical representation of example images before and after rectification.

The global transformation module 309 computes a global transformation matrix using the final rectification parameters ($\theta^*$, $\psi^*$, $\phi^*$) and performs image rectification on the input image using the global transformation matrix. In some embodiments, the global transformation module 309 computes the global transformation matrix R by substituting the final rectification parameters ($\theta^*$, $\psi^*$, $\phi^*$) into Equation 5 described above and rectifies the input image by applying the transformation matrix R to x-y coordinates of each object in the input image based on Equation 2 described above. FIG. 11 is a graphical representation 1100 of example images before and after rectification. The image 1102 on the left is the distorted image. The image 1104 on the right is the rectified image. By undoing the distortion of the input image, the rectified image appears with the horizontal and vertical lines (e.g., shelves and product edges) in the correct directions.

When an input image includes an arrangement of organized objects, for example, a retail display image where products sit on shelves of a retail store, the global transformation module 309 may perform image rectification on the input image based on information of two types of objects: products and shelves. For example, the global transformation module 309 may compute a global transformation matrix R based on the products, based on the shelves, or based on both the products and shelves. In some embodiments, the image recognition module 203 determines shelf annotation for the shelves identified from the input image. The shelf annotation includes coordinates of left edge, right edge, top edge and bottom edge of a shelf. The local transformation module 301 compares the shelf annotation with the standard shelf dimension information stored in the data storage 243, and computes a local transformation matrix for the shelf. Based on the local transformation matrix for each shelf of the shelves in the input image, the global transformation module 309 may determine a global transformation matrix R that transforms shelf coordinates and the slopes of shelf edges as illustrated in FIGS. 12 and 13.

Figure 12:
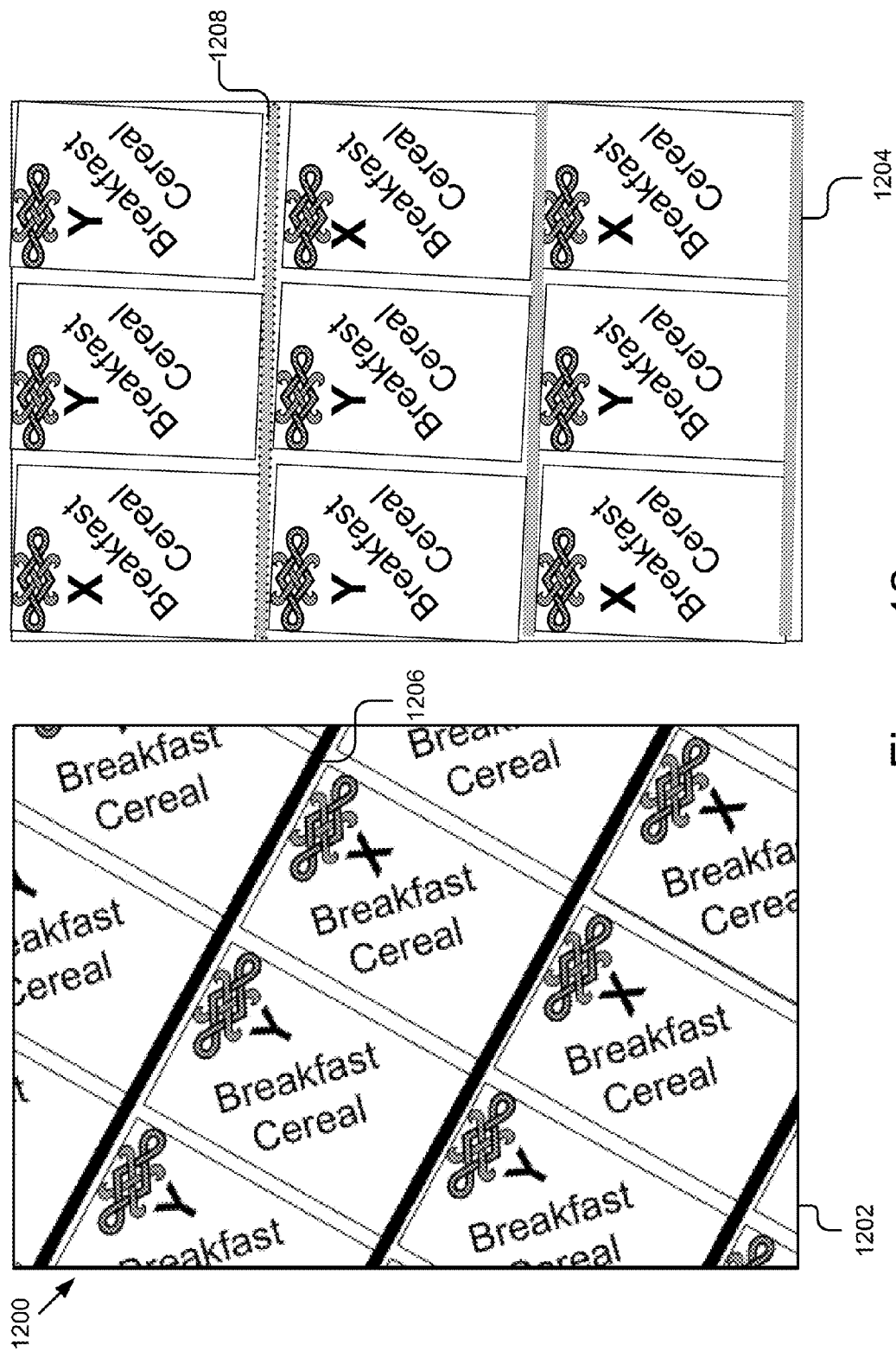
FIG. 12 is a graphical representation of example images with shelf annotations before and after rectification.

FIG. 12 is a graphical representation 1200 of example images with shelf annotations before and after rectification. On the input image 1202, shelf 1206 tilts. After image rectification, the shelf annotation 1208 for the shelf 1206, represented by the gray area surrounded by the dotted lines, shows that the shelf 1206 appears nearly horizontal in the rectified image 1104 on the right.

Figure 13:
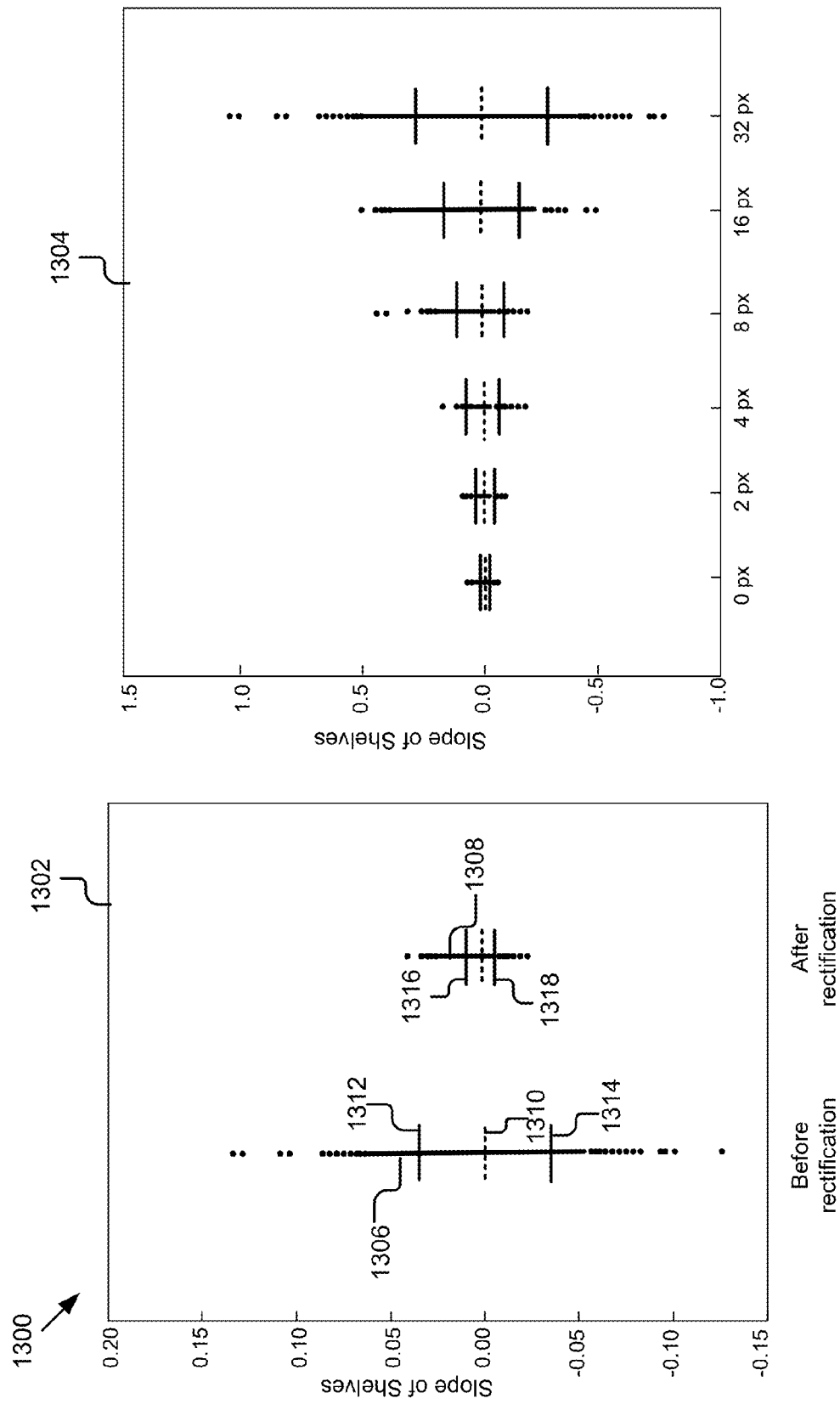
FIG. 13 is a graphical representation of scatter plots of shelf slope values before and after rectification.

FIG. 13 is a graphical representations 1300 of scatter plots of shelf slope values before and after rectification. The shelf slopes after rectification can be used to indicate the quality of image rectification using the global transformation matrix R. On the scatter plot 1302, the vertical line 1306 includes a set of dots. Each dot corresponds to a shelf slope value before image rectification. The shelf slope value is calculated as the tangent of the angle that a shelf makes with the horizontal axis. The markers 1310 shown in the dashed line represents a mean slope. The markers 1312 and 1314 shown in solid lines denote the standard deviation. The amount of the deviation marked by 1312 and 1314 shows that the shelf tilts before rectification. The vertical line 1308 includes a set of dots representing shelf slope values after image rectification. Similar markers are also shown on the vertical line 1308. The deviation marked by the markers 1316 and 1318 indicate that the shelf slopes are clustered closer to 0, which means that the shelf orientations after rectification are closer to horizontal than before rectification.

The scatter plot 1304 of FIG. 13 shows the rectification result using the global transformation matrix R when a certain amount of noise is present. The ROIs associated with the identified objects are perturbed using a White Gaussian noise with standard deviation of 2, 4, 6, 8 and 32 pixels. The local transformation module 301 estimates the local affine matrices based on the noisy ROIs for a plurality of objects. The global transformation module 309 computes a global transformation matrix R base on the local affine matrices and performs image rectification using the global transformation matrix R. The rectification result is shown in 1304 similarly as in 1302, which indicate that the rectification performance degrades as the noise level increases (as shown in the horizontal axis).

In some embodiments, the global transformation module 309 transmits the rectified image to the image recognition module 203 to re-identify objects from the rectified image, which should outperform the object identification from the original input image. For example, the image recognition module 203 may identify more objects or more attributes of the identified objects from the rectified image than from the input image. The image recognition module 203 may receive additional information from the modules 301-307 and perform image recognition on the rectified image using the additional information to improve recognition accuracy as described below.

In some embodiments, the image recognition module 203 receives an input image, computes a first set of features from the input image and recognizes a plurality of objects in the input image using the first set of features. The image rectification module 205 rectifies the input image as described above. The image recognition module 203 computes a second set of features from the rectified image. The image recognition module 203 then combines the first and second sets of features and recognizes the plurality of objects from the rectified image using the combined features. In some embodiments, the image recognition module 203 also performs image recognition on the rectified image using the global transformation matrix computed by the image rectification module 205 in obtaining the rectified image. As a result, the image recognition module 203 may identify objects using features present in the rectified image that were not detectable based on features present in the original input image.

Returning to the example of FIG. 2, in some embodiments, the global transformation module 309 also transmits the rectified image to the image stitching module 207. The image stitching module 207 may include software and/or logic for performing image stitching on rectified images received from the image rectification module 205. In some embodiments, the image rectification module 205 receives input images and identifies objects from each of the input images. The image rectification module 205 computes a global transformation matrix for each input image and performs rectification on each individual input image based on the global transformation matrix associated with each input image as described above. In some embodiments, the image stitching module 207 receives the rectified images and performs image stitching on the rectified input images. As a result, the stitching accuracy and efficiency improve along with a reduction in complexity. In other embodiments, in addition to the rectified images, the image stitching module 207 also receives local transformation matrices for the objects identified from the input images, sets of inliers associated with each individual input image that are reduced from the objects based on a voting procedure, and other information from the image rectification module 205. The image stitching module 207 performs image stitching on the rectified input images based on the information received from the image rectification module 205. Since the image stitching module 207 receives information (e.g., local transformation matrices, sets of inliers) that can be used for an image stitching process from the image rectification module 205, the image stitching process is greatly simplified.

In some embodiments, the image recognition module 203, the image rectification module 205, and the image stitching module 207 cooperate with each other to combine object lists to identify duplicates and produce a single object list. The image recognition module 203 receives input images and identifies a list of objects from the individual input images. The image rectification module 205 computes a global transformation matrix R for the individual input images and performs image rectification on the individual image based on the global transformation matrix R. The image stitching module 207 computes one or more homography transformation matrices and performs image stitching on the rectified images. The list of objects identified from each individual image is then processed using the global transformation matrix R and the one or more homography transformation matrices to determine whether there are duplicate recognized objects in the list and remove the duplicates.

In other embodiments, the image recognition module 203, the image rectification module 205, and the image stitching module 207 cooperate with each other to combine features extracted from pre-rectified images and rectified images and obtain a final object recognition result based on the combined features. The image recognition module 203 receives input images, computes a first set of features from the individual images of the input images, and recognizes a plurality of objects in the input images using the first set of features. The image rectification module 205 computes a global transformation matrix R for the individual input images and performs image rectification on the individual input images based on the global transformation matrix R. The image recognition module 203 computes a second set of features from each of the rectified images. The image stitching module 207 computes one or more homography transformation matrices and performs image stitching on the rectified images. The image recognition module 203 combines the first and second sets of features computed from the pre-rectified images and the rectified images, and determines a final recognition result of objects for each individual input image based on the combined features.

The user interface engine 209 may include software and/or logic for providing user interfaces to a user. In some embodiments, the user interface engine 209 receives instructions from the image recognition module 203 to generate a graphical interface that instructs the user to capture an image of a retail shelf stocking products. In some embodiments, responsive to a user of a client device 115 capturing the image, the user interface engine 209 receives information, including product identification, from the image recognition module 203 and generates an outline to identify the region of interest associated with each identified product. In some embodiments, the user interface engine 209 generates graphical data for displaying a rectified image received from the image rectification module 205. In other embodiments, the user interface engine 209 sends the graphical user interface data to an application (e.g., a browser) in the client device 115 via the communication unit 241 causing the application to display the data in a user interface.

Figure 14:
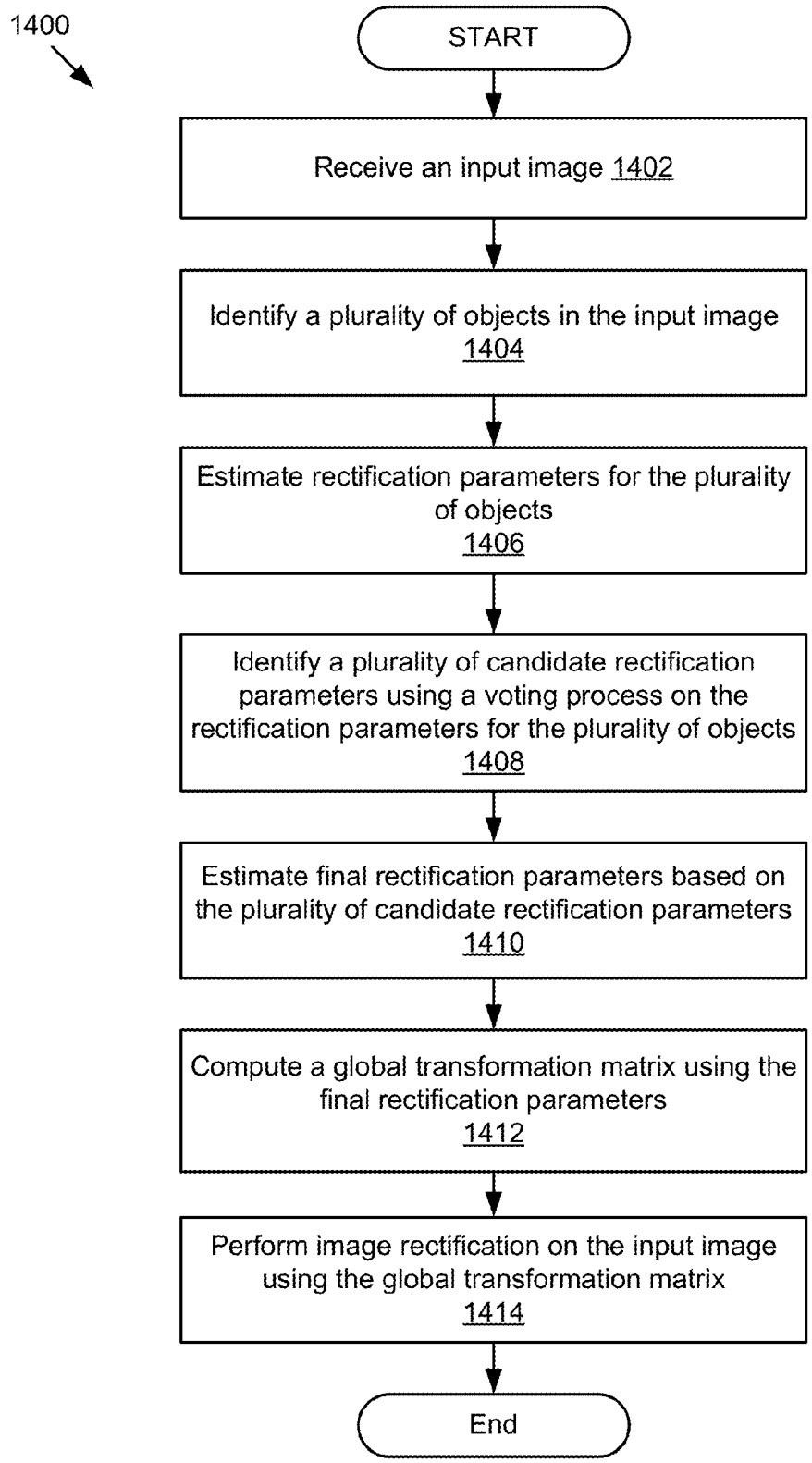
FIG. 14 is a flow diagram illustrating one embodiment of a method for performing image rectification on an input image.

FIG. 14 is a flow diagram 1400 illustrating one embodiment of a method for performing image rectification on an input image. As described above, the image recognition application 103 may include an image recognition module 203 and an image rectification module 205. At 1402, the image recognition module 203 receives an input image. The input image may include perspective distortion. At 1404, the image recognition module 203 identifies a plurality of objects in the input image. The image recognition module 203 transmits the identified objects and associated information to the image rectification module 205. The information includes, for example, a spatial location of an object and a ROI bordering the object.

At 1406, the image rectification module 205 estimates rectification parameters for the plurality of objects, for example, based on the ROIs associated with the plurality of objects as described above. At 1408, the image rectification module 205 identifies a plurality of candidate rectification parameters using a voting process on the rectification parameters for the plurality of objects. For example, the image rectification module 205 performs a Hough voting procedure to identify the plurality of candidate rectification parameters. At 1410, the image rectification module 205 estimates final rectification parameters based on the plurality of candidate rectification parameters. At 1412, the image rectification module 205 computes a global transformation matrix using the final rectification parameters. At 1414, the image rectification module 205 performs image rectification on the input image using the global transformation matrix to correct the perspective distortion in the input image.

Figure 15:
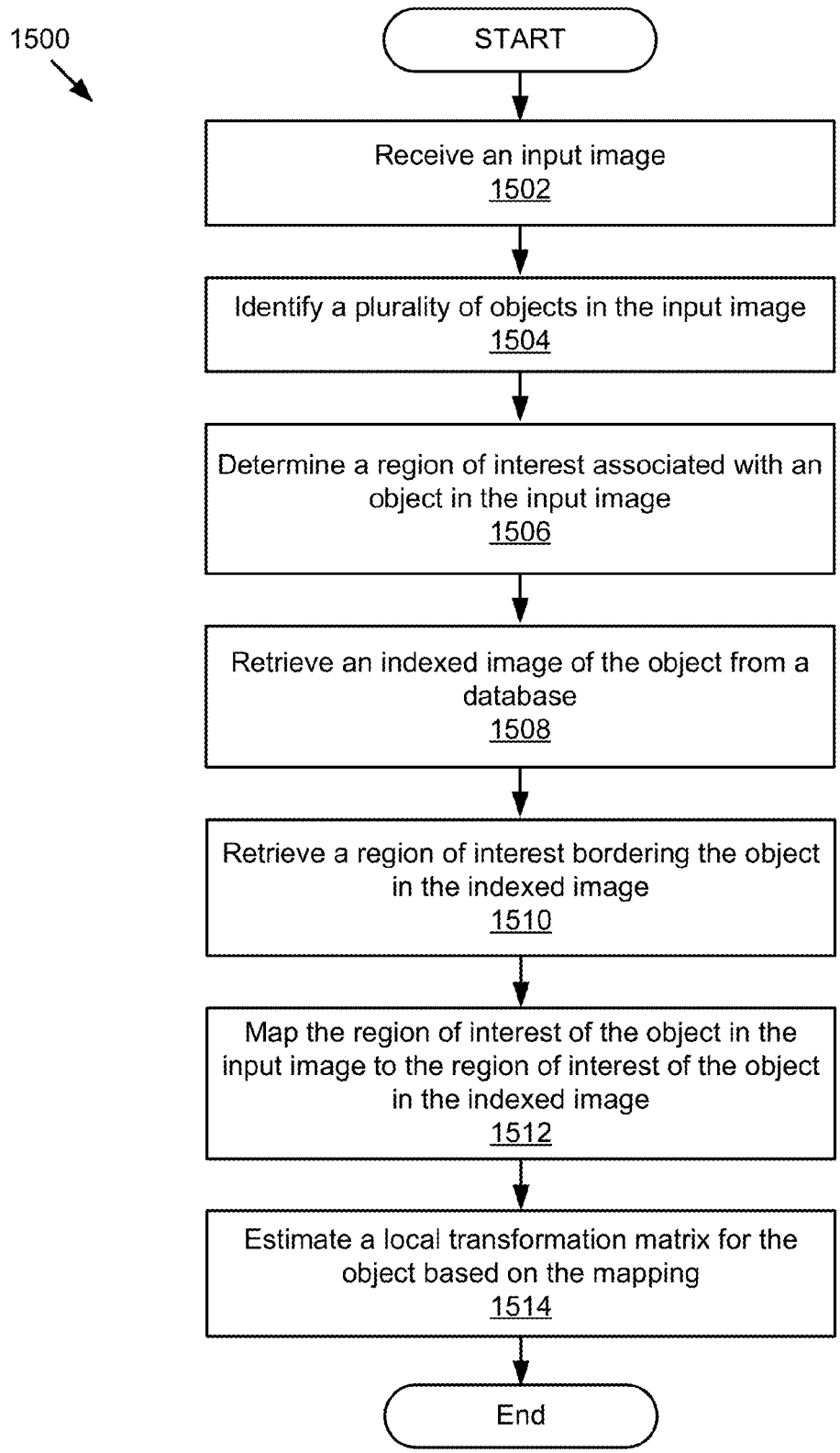
FIG. 15 is a flow diagram illustrating one embodiment of a method for estimating a local transformation matrix for an object identified from an input image.

FIG. 15 is a flow diagram 1500 illustrating one embodiment of a method for estimating a local transformation matrix for an object identified from an input image. As described above, the image recognition application 103 may include an image recognition module 203 and an image rectification module 205. The image rectification module 205 includes a local transformation module 301. At 1502, the image recognition module 203 receives an input image. At 1504, the image recognition module 203 identifies a plurality of objects in the input image. At 1506, the image recognition module 203 determines a region of interest (ROI) associated with an object in the input image. The image recognition module 203 transmits the object and associated ROI to the local transformation module 301. At 1508, the local transformation module 301 retrieves an indexed image of the object from a database on the data storage 243. At 1510, the local transformation module 301 also retrieves a region of interest of the object in the indexed image. At 1512, the local transformation module 301 maps the region of interest of the object in the input image to the region of interest of the object in the indexed image. At 1514, the local transformation module 301 estimates a local transformation matrix for the object based on the mapping. In some embodiments, the local transformation matrix is an affine matrix. The affine matrix estimated for a small region of each object can be used to approximate a global projective matrix for the entire input image as described above.

Figure 16A:
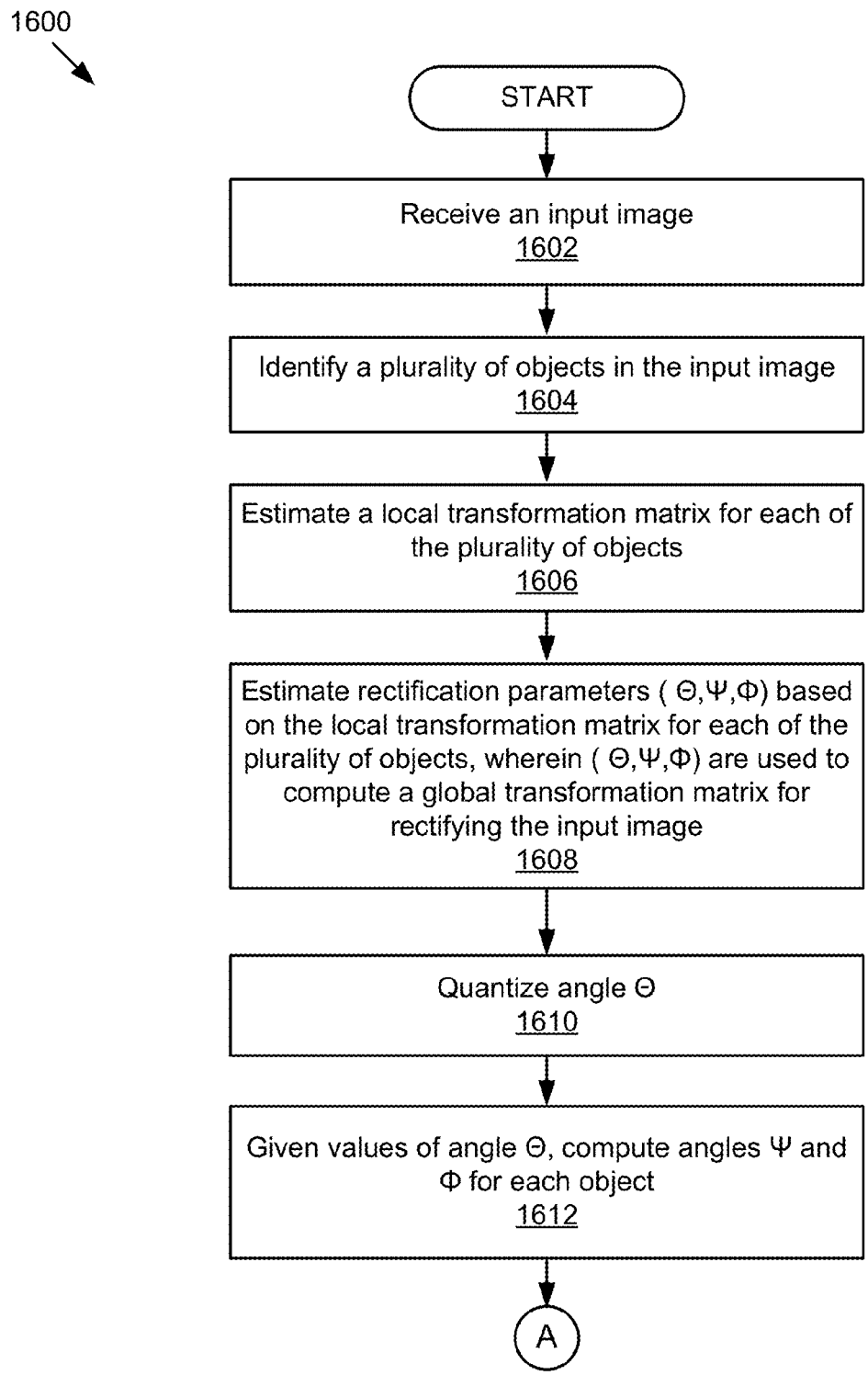
FIGS. 16A and 16B are a flow diagram illustrating another embodiment of a method for performing image rectification on an input image.
Figure 16B:
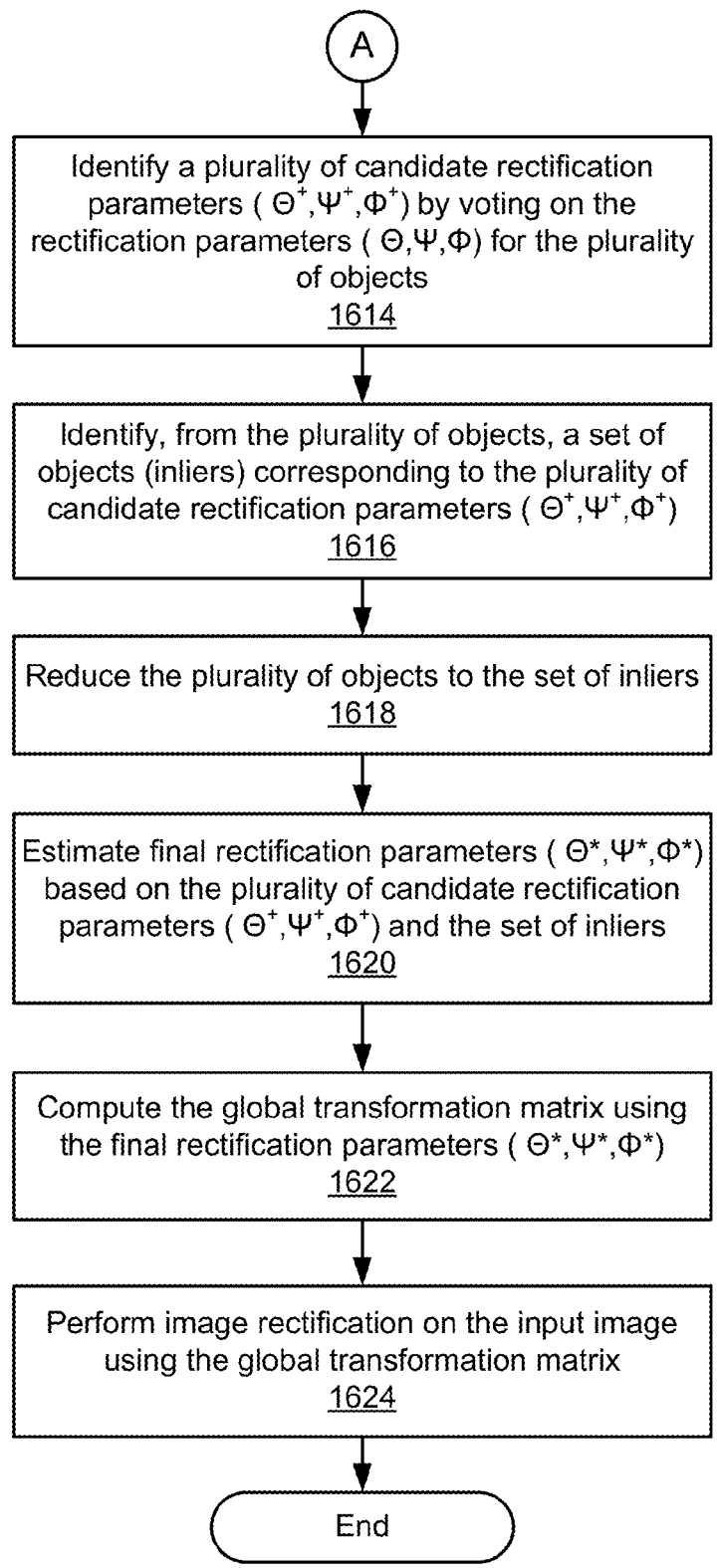

FIGS. 16A and 16B are a flow diagram 1600 illustrating another embodiment of a method for performing image rectification on an input image. As described above, the image recognition application 103 may include an image recognition module 203 and an image rectification module 205. The image rectification module 205 may include a local transformation module 301, a parameter estimation module 303, a voting module 305, an optimization module 307, and a global transformation module 309. In FIG. 16A, the image recognition module 203 receives 1602 an input image. At 1604, the image recognition module 203 identifies a plurality of objects in the input image. The image recognition module 203 also identifies a ROI associated with each object. The image recognition module 203 transmits the identified objects and ROIs associated with the objects to the local transformation module 301. At 1606, the local transformation module 301 estimates a local transformation matrix for each of the plurality of objects in the input image. For example, the local transformation module 301 computes a location transformation matrix for an object based on mapping the ROI of the object in the input image to the ROI of the object in the indexed image. At 1608, the parameter estimation module 303 estimates rectification parameters ($\theta$, $\psi$, $\phi$) based on the local transformation matrix for each of the plurality of objects, wherein ($\theta$, $\psi$, $\phi$) are used to compute a global transformation matrix for rectifying the input image. At 1610, the parameter estimation module 303 quantizes the angle $\theta$. At 1612, the parameter estimation module 303 computes angles $\psi$ and $\phi$ for each object given the quantized values of $\theta$. For example, the parameter estimation module 303 quantizes the angle $\theta$ to get the quantized values ($\theta_L$, $\theta_L+\Delta\theta$, $\theta_L+2\Delta\theta$, . . . , $\theta_U$). The parameter estimation module 303 then computes values of angles $\psi$ and $\phi$ by substituting the quantized values ($\theta_L$, $\theta_L+\Delta\theta$, $\theta_L+2\Delta\theta$, . . . , $\theta_U$).

Referring now to FIG. 16B, the voting module 305 identifies 1614 a plurality of candidate rectification parameters ($\theta^+$, $\psi^+$, $\phi^+$) using a voting procedure on the rectification parameters ($\theta$, $\psi$, $\phi$) for the plurality of objects. In some embodiments, the voting module 305 performs a Hough transform voting procedure on a distribution of rectification parameters ($\theta$, $\psi$, $\phi$) as described above. For example, the voting module 305 identifies the rectification parameters that receive a maximum number of votes as the candidate rectification parameters ($\theta^+$, $\psi^+$, $\phi^+$).

At 1616, the optimization module 307 identifies, from the plurality of objects, a set of objects (inliers) corresponding to the plurality of candidate rectification parameters ($\theta^+$, $\psi^+$, $\phi^+$). For example, the optimization module 307 determines that three out of four objects contribute the votes for the plurality of candidate rectification parameters ($\theta^+$, $\psi^+$, $\phi^+$) and identifies the three objects as inliers. At 1618, the optimization module 307 reduces the plurality of objects to the set of inliers. Continuing with the above example, the optimization module 307 eliminates one object and uses the set of three objects to determine final rectification parameters. At 1620, the optimization module 307 estimates final rectification parameters ($\theta^*$, $\psi^*$, $\phi^*$) based on the plurality of candidate rectification parameters ($\theta^+$, $\psi^+$, $\phi^+$) and the set of inliers. At 1622, the global transformation module 309 computes the global transformation matrix using the final rectification parameters ($\theta^*$, $\psi^*$, $\phi^*$). At 1624, the global transformation module 309 performs image rectification on the input image using the global transformation matrix.

Figure 17:
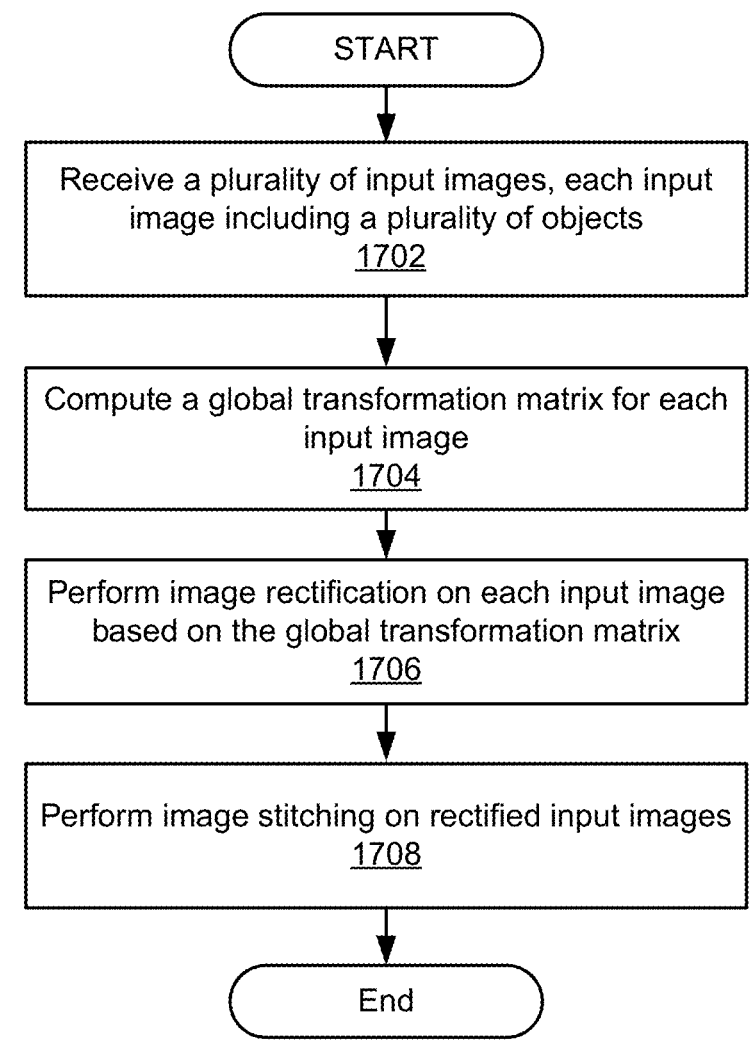
FIG. 17 is a flow diagram illustrating one embodiment of a method for performing image stitching on a rectified image.

FIG. 17 is a flow diagram 1700 illustrating one embodiment of a method for performing image stitching on a rectified image. As described above, the image recognition application 103 may include an image rectification module 205 and an image stitching module 207. At 1702, the image rectification module 205 receives a plurality of input images, each input image including a plurality of objects. At 1704, the image rectification module 205 computes a global transformation matrix for each input image. At 1706, the image rectification module 205 performs image rectification on each input image based on the global transformation matrix. At 1708, the image stitching module 207 performs image stitching on the rectified input images. In some embodiments, the image stitching module 207 also receives information (e.g., local transformation matrices, sets of inliers, etc.) that may be used for an image stitching process from the image rectification module 205, and performs a simplified image stitching process on the rectified images using the information from the image rectification module 205.

Figure 18:
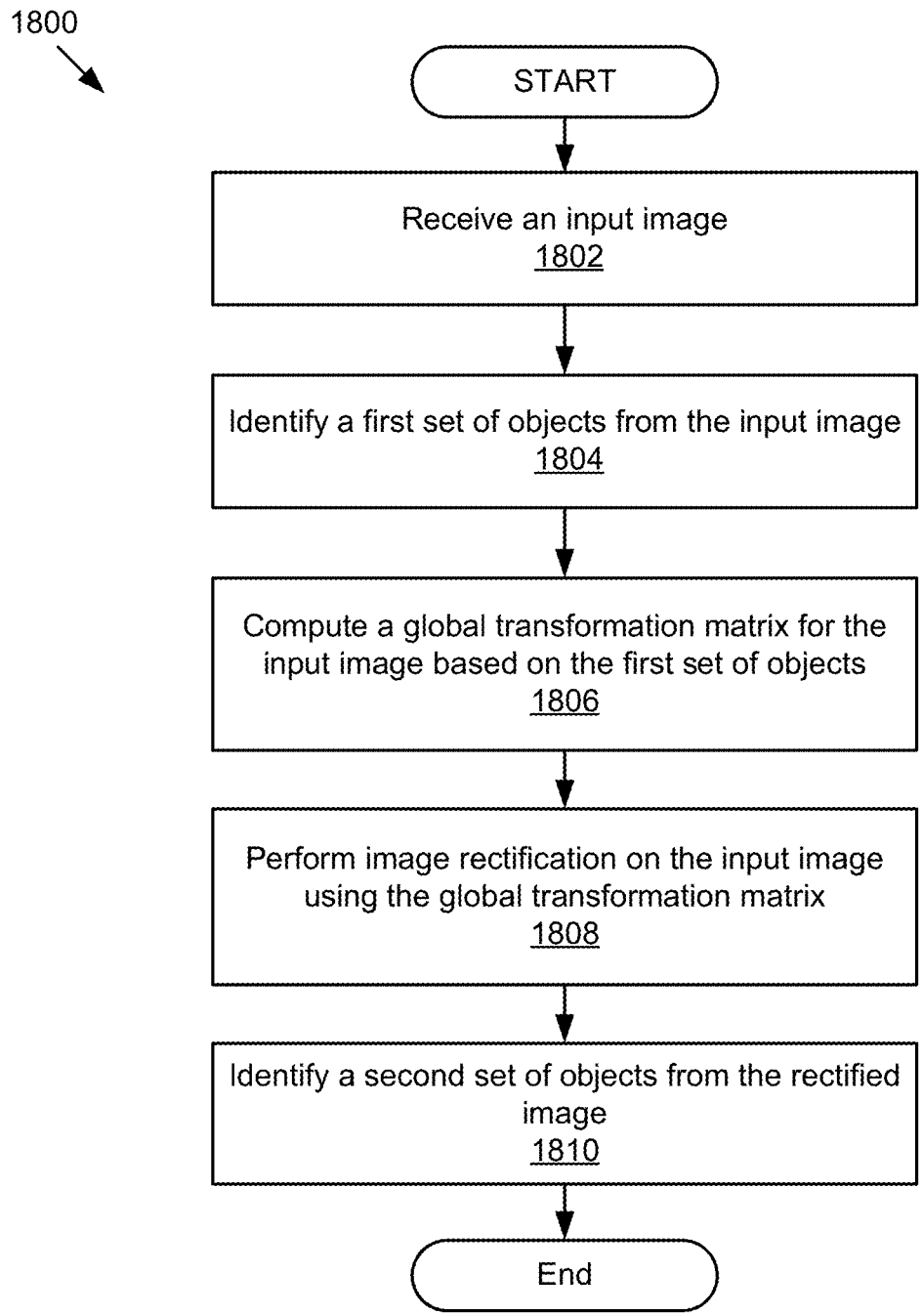
FIG. 18 is a flow diagram illustrating one embodiment of a method for performing image recognition on a rectified image.

FIG. 18 is a flow diagram 1800 illustrating one embodiment of a method for performing image recognition on a rectified image. As described above, the image recognition application 103 may include an image recognition module 203 and an image rectification module 205. The image recognition module 203 receives 1802 an input image. At 1804, the image recognition module 203 identifies a first set of objects from the input image. At 1806, the image rectification module 205 computes a global transformation matrix for the input image based on the first set of objects. At 1808, the image rectification module 205 performs image rectification on the input image using the global transformation matrix. At 1810, the image recognition module 203 identifies a second set of objects from the rectified image. Since the rectified image removes the perspective distortion on the original input image, the image recognition on the rectified image should outperform the image recognition on the input image. For example, the second set of objects may include more objects than in the first set of objects. Or the second set of objects may include more objects attributes than the first set of objects.

A system and method for performing image rectification using a single input image has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, by one or more processors, an input image;
    identifying, by the one or more processors, a plurality of objects in the input image;
    estimating, by the one or more processors, a local transformation matrix for each of the plurality of objects;
    calculating rectification parameters for the plurality of objects using the local transformation matrix;
    identifying, by the one or more processors, a plurality of candidate rectification parameters using a voting procedure on the rectification parameters for the plurality of objects;
    estimating, by the one or more processors, final rectification parameters based on the plurality of candidate rectification parameters;
    computing, by the one or more processors, a global transformation matrix using the final rectification parameters; and
    performing, by the one or more processors, image rectification on the input image using the global transformation matrix.

2. The computer-implemented method of claim 1, wherein estimating the final rectification parameters based on the plurality of candidate rectification parameters comprises:
    identifying, from the plurality of objects, a set of objects corresponding to the plurality of candidate rectification parameters; and
    calculating the final rectification parameters based on the set of objects.

3. The computer-implemented method of claim 1, wherein identifying the plurality of candidate rectification parameters using the voting procedure on the rectification parameters for the plurality of objects comprises identifying the candidate rectification parameters with a maximum number of votes.

4. The computer-implemented method of claim 1, wherein estimating the local transformation matrix for each of the plurality of objects comprises:
    determining a region of interest associated with an object in the input image;
    retrieving an indexed image of the object from a database;
    retrieving a region of interest associated with the object in the indexed image;
    mapping the region of interest of the object in the input image to the region of interest of the object in the indexed image; and
    estimating the local transformation matrix based on the mapping.

5. The computer-implemented method of claim 1, wherein the local transformation matrix is an affine transformation matrix.

6. The computer-implemented method of claim 1, further comprising:
    performing image rectification on a plurality of input images; and
    performing image stitching on the rectified input images.

7. The computer-implemented method of claim 1, further comprising performing image recognition on the rectified input image.

8. A system comprising;
    one or more processors; and
    a memory, the memory storing instructions, which when executed cause the one or more processor to:

receive an input image;

identify a plurality of objects in the input image;

estimate a local transformation matrix for each of the plurality of objects;

calculate rectification parameters for the plurality of objects using the local transformation matrix;

identify a plurality of candidate rectification parameters using a voting procedure on the rectification parameters for the plurality of objects;

estimate final rectification parameters based on the plurality of candidate rectification parameters;

compute a global transformation matrix using the final rectification parameters; and perform image rectification on the input image using the global transformation matrix.

9. The system of claim 8, wherein to estimate the final rectification parameters based on the plurality of candidate rectification parameters, the instructions cause the one or more processors to:

identify, from the plurality of objects, a set of objects corresponding to the plurality of candidate rectification parameters; and calculate the final rectification parameters based on the set of objects.

10. The system of claim 8, wherein to identify the plurality of candidate rectification parameters using the voting procedure on the rectification parameters for the plurality of objects, the instructions cause the one or more processors to identify the candidate rectification parameters with a maximum number of votes.

11. The system of claim 8, wherein to estimate the local transformation matrix for each of the plurality of objects, the instructions cause the one or more processors to:

determine a region of interest associated with an object in the input image;

retrieve an indexed image of the object from a database;

retrieve a region of interest associated with the object in the indexed image;

map the region of interest of the object in the input image to the region of interest of the object in the indexed image; and estimate the local transformation matrix based on the mapping.

12. The system of claim 8, wherein the local transformation matrix is an affine transformation matrix.

13. The system of claim 8, wherein the instructions cause the one or more processors to:

perform image rectification on a plurality of input images; and perform image stitching on the rectified input images.

14. The system of claim 8, wherein the instructions cause the one or more processors to perform image recognition on the rectified input image.

15. A computer program product comprising a non-transitory computer readable medium storing a computer readable program, wherein the computer readable program when executed causes a computer to:

receive an input image;

identify a plurality of objects in the input image;

estimate a local transformation matrix for each of the plurality of objects;

calculate rectification parameters for the plurality of objects using the local transformation matrix;

identify a plurality of candidate rectification parameters using a voting procedure on the rectification parameters for the plurality of objects;

estimate final rectification parameters based on the plurality of candidate rectification parameters;

compute a global transformation matrix using the final rectification parameters; and perform image rectification on the input image using the global transformation matrix.

16. The computer program product of claim 15, wherein to estimate the final rectification parameters based on the plurality of candidate rectification parameters, the computer readable program causes the computer to:

identify, from the plurality of objects, a set of objects corresponding to the plurality of candidate rectification parameters; and calculate the final rectification parameters based on the set of objects.

17. The computer program product of claim 15, wherein to identify the plurality of candidate rectification parameters using the voting procedure on the rectification parameters for the plurality of objects, the computer readable program causes the computer to identify the candidate rectification parameters with a maximum number of votes.

18. The computer program product of claim 15, wherein to estimate the local transformation matrix for each of the plurality of objects, the computer readable program causes the computer to:

determine a region of interest bordering an object in the input image;

retrieve an indexed image of the object from a database;

retrieve a region of interest bordering the object in the indexed image;

map the region of interest of the object in the input image to the region of interest of the object in the indexed image; and estimate the local transformation matrix based on the mapping.

19. The computer program product of claim 15, wherein the computer readable program causes the computer to:

perform image rectification on a plurality of input images; and perform image stitching on the rectified input images.

20. The computer program product of claim 15, wherein the computer readable program causes the computer to perform image recognition on the rectified input image.

\* \* \* \* \*